(12) United States Patent  
Moore

(10) Patent No.: US 11,975,223 B2
(45) Date of Patent: *May 7, 2024

(54) QUINT CONFIGURATION FIRE APPARATUS

(71) Applicant: Oshkosh Corporation, Oshkosh, WI (US)

(72) Inventor: Michael R. Moore, New London, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/377,539

(22) Filed: Oct. 6, 2023

(65) Prior Publication Data

US 2024/0033550 A1 Feb. 1, 2024

Related U.S. Application Data

(63) Continuation of application No. 17/029,706, filed on Sep. 23, 2020, now Pat. No. 11,813,488, which is a (Continued)

(51) Int. Cl.
*A62C 27/00* (2006.01)
*B60B 35/00* (2006.01)
(Continued)

(52) U.S. Cl.
CPC .............. *A62C 27/00* (2013.01); *B60B 35/00* (2013.01); *B60B 35/004* (2013.01); *B60G 11/02* (2013.01);
(Continued)

(58) Field of Classification Search
CPC ....... A62C 27/00; B60B 35/00; B60B 35/004; B60G 11/02; B60G 11/11; B60G 11/10; B60G 11/27; E06C 5/04; E06C 5/38
See application file for complete search history.

(56) References Cited

U.S. PATENT DOCUMENTS 2,500,815 A 3/1950 Gerli
2,614,743 A 10/1952 Arps
(Continued)

FOREIGN PATENT DOCUMENTS

CA 2313669 A1 1/2002
CN 203050481 7/2013
(Continued)

OTHER PUBLICATIONS

U.S. Appl. No. 08/046,623, filed Apr. 14, 1993, Schmitz et al.
(Continued)

*Primary Examiner* — Steven M Cernoch
(74) *Attorney, Agent, or Firm* — Foley & Lardner LLP

(57) ABSTRACT

A quint configuration fire apparatus includes a chassis, a body assembly coupled to the chassis and having a storage area configured to receive a ground ladder and a fire hose, a pump coupled to the chassis, a water tank coupled to the chassis, a ladder assembly having a proximal end that is coupled to the chassis, a single front axle coupled to a front end of the chassis, and a single rear axle coupled to a rear end of the chassis. The center of gravity of at least one of the chassis, the body assembly, the pump, and the water tank are positioned to counterbalance a moment generated by a tip load with the ladder assembly extended to the horizontal reach of at least 90 feet.

21 Claims, 20 Drawing Sheets

Related U.S. Application Data continuation of application No. 16/779,897, filed on Feb. 3, 2020, now abandoned, which is a continuation of application No. 15/811,241, filed on Nov. 13, 2017, now abandoned, which is a continuation of application No. 15/460,901, filed on Mar. 16, 2017, now Pat. No. 9,814,915, which is a continuation of application No. 15/351,417, filed on Nov. 14, 2016, now Pat. No. 9,597,536, which is a continuation of application No. 14/552,252, filed on Nov. 24, 2014, now Pat. No. 9,504,863.

(51) Int. Cl.
| | |
|---|---|
| *B60G 11/02* | (2006.01) |
| *B60G 11/10* | (2006.01) |
| *B60G 11/27* | (2006.01) |
| *E06C 5/04* | (2006.01) |
| *E06C 5/38* | (2006.01) |

(52) U.S. Cl.
CPC .............. *B60G 11/10* (2013.01); *B60G 11/27* (2013.01); *E06C 5/04* (2013.01); *E06C 5/38* (2013.01)

(56) References Cited

U.S. PATENT DOCUMENTS

| | | | |
|---|---|---|---|
| 3,346,052 A | 10/1967 | Moore et al. | |
| 3,550,146 A | 12/1970 | Eberle | |
| 3,675,721 A | 7/1972 | Davidson et al. | |
| 3,770,062 A | 11/1973 | Riggs | |
| 3,789,869 A | 2/1974 | Morris | |
| 4,094,381 A | 6/1978 | Wilkerson | |
| 4,317,504 A | 3/1982 | Artaud et al. | |
| 4,410,045 A | 10/1983 | Whitman | |
| 4,556,200 A | 12/1985 | Shoemaker | |
| 4,570,973 A | 2/1986 | Ewers et al. | |
| 4,705,140 A | 11/1987 | Dudley et al. | |
| 4,852,690 A | 8/1989 | Salmi | |
| 4,941,546 A | 7/1990 | Nist et al. | |
| 4,998,982 A | 3/1991 | Arnold et al. | |
| 5,129,480 A | 7/1992 | Garrett et al. | |
| 5,137,115 A | 8/1992 | Arnold | |
| 5,368,317 A | 11/1994 | McCombs et al. | |
| 5,389,031 A | 2/1995 | Sharpe et al. | |
| 5,538,274 A | 7/1996 | Schmitz et al. | |
| 5,722,505 A | 3/1998 | Grabner et al. | |
| 5,788,158 A | 8/1998 | Relyea | |
| 5,820,150 A | 10/1998 | Archer et al. | |
| 5,839,664 A | 11/1998 | Relyea | |
| 5,897,123 A | 4/1999 | Cherney et al. | |
| 6,006,841 A | 12/1999 | Hunke | |
| 6,105,984 A | 8/2000 | Schmitz et al. | |
| 6,145,619 A | 11/2000 | Risser | |
| 6,193,007 B1 | 2/2001 | Lie | |
| 6,405,831 B1 | 6/2002 | Daniel, III | |
| 6,421,593 B1 | 7/2002 | Kempen et al. | |
| 6,516,914 B1 | 2/2003 | Andersen et al. | |
| 6,520,494 B1 | 2/2003 | Andersen et al. | |
| 6,553,290 B1 | 4/2003 | Pillar | |
| 6,561,718 B1 | 5/2003 | Archer et al. | |
| 6,598,702 B1 | 7/2003 | McGillewie et al. | |
| 6,755,258 B1 | 6/2004 | Hunke et al. | |
| 6,757,597 B2 | 6/2004 | Yakes et al. | |
| 6,764,085 B1 | 7/2004 | Anderson | |
| 6,811,161 B1 | 11/2004 | Anderson | |
| 6,860,332 B1 | 3/2005 | Archer et al. | |
| 6,882,917 B2 | 4/2005 | Pillar et al. | |
| 6,883,815 B2 | 4/2005 | Archer | |
| 6,885,920 B2 | 4/2005 | Yakes et al. | |
| 6,909,944 B2 | 6/2005 | Pillar et al. | |
| 6,922,615 B2 | 7/2005 | Pillar et al. | |
| 6,973,768 B2 | 12/2005 | Samejima et al. | |
| 6,976,688 B2 | 12/2005 | Archer et al. | |
| 6,993,421 B2 | 1/2006 | Pillar et al. | |
| 7,006,902 B2 | 2/2006 | Archer et al. | |
| 7,024,296 B2 | 4/2006 | Squires et al. | |
| 7,055,880 B2 | 6/2006 | Archer | |
| 7,072,745 B2 | 7/2006 | Pillar et al. | |
| 7,100,741 B2 | 9/2006 | Wissler et al. | |
| 7,107,129 B2 | 9/2006 | Rowe et al. | |
| 7,127,331 B2 | 10/2006 | Pillar et al. | |
| 7,162,332 B2 | 1/2007 | Pillar et al. | |
| 7,164,977 B2 | 1/2007 | Yakes et al. | |
| 7,178,631 B2 | 2/2007 | Salmi et al. | |
| 7,184,862 B2 | 2/2007 | Pillar et al. | |
| 7,184,866 B2 | 2/2007 | Squires et al. | |
| 7,201,255 B1 | 4/2007 | Kreikemeier | |
| 7,234,534 B2 | 6/2007 | Froland et al. | |
| 7,254,468 B2 | 8/2007 | Pillar et al. | |
| 7,274,976 B2 | 9/2007 | Rowe et al. | |
| 7,277,782 B2 | 10/2007 | Yakes et al. | |
| 7,302,320 B2 | 11/2007 | Nasr et al. | |
| 7,308,968 B2 | 12/2007 | Denison | |
| 7,331,586 B2 | 2/2008 | Trinkner et al. | |
| 7,379,797 B2 | 5/2008 | Nasr et al. | |
| 7,387,348 B2 | 6/2008 | Archer et al. | |
| 7,389,826 B2 | 6/2008 | Linsmeier et al. | |
| 7,392,122 B2 | 6/2008 | Pillar et al. | |
| 7,412,307 B2 | 8/2008 | Pillar et al. | |
| 7,439,711 B2 | 10/2008 | Bolton | |
| 7,451,028 B2 | 11/2008 | Pillar et al. | |
| 7,522,979 B2 | 4/2009 | Pillar | |
| 7,555,369 B2 | 6/2009 | Pillar et al. | |
| 7,631,700 B1 | 12/2009 | Gil | |
| 7,689,332 B2 | 3/2010 | Yakes et al. | |
| 7,711,460 B2 | 5/2010 | Yakes et al. | |
| 7,715,962 B2 | 5/2010 | Rowe et al. | |
| 7,725,225 B2 | 5/2010 | Pillar et al. | |
| 7,729,831 B2 | 6/2010 | Pillar et al. | |
| 7,756,621 B2 | 7/2010 | Pillar et al. | |
| 7,784,554 B2 | 8/2010 | Grady et al. | |
| 7,792,618 B2 | 9/2010 | Quigley et al. | |
| 7,792,949 B2 | 9/2010 | Tewari et al. | |
| 7,828,116 B2 | 11/2010 | Vetesnik | |
| 7,835,838 B2 | 11/2010 | Pillar et al. | |
| 7,848,857 B2 | 12/2010 | Nasr et al. | |
| 7,874,373 B2 | 1/2011 | Morrow et al. | |
| 8,000,850 B2 | 8/2011 | Nasr et al. | |
| 8,095,247 B2 | 1/2012 | Pillar et al. | |
| 8,201,656 B2 | 6/2012 | Archer et al. | |
| 8,215,241 B2 | 7/2012 | Garneau et al. | |
| 8,376,719 B2 | 2/2013 | Grady et al. | |
| 8,413,764 B1 | 4/2013 | Cohen et al. | |
| 8,739,892 B2 | 6/2014 | Moore et al. | |
| 8,839,902 B1 | 9/2014 | Archer et al. | |
| 9,089,728 B2 | 7/2015 | Halley | |
| 9,302,129 B1 | 4/2016 | Betz et al. | |
| 9,492,695 B2 | 11/2016 | Betz et al. | |
| 9,504,863 B2 | 11/2016 | Moore | |
| 9,580,960 B2 | 2/2017 | Aiken et al. | |
| 9,580,962 B2 | 2/2017 | Betz et al. | |
| 9,597,536 B1 | 3/2017 | Moore | |
| 9,677,334 B2 | 6/2017 | Aiken et al. | |
| 10,442,668 B1 | 10/2019 | Betz et al. | |
| 11,813,488 B2 * | 11/2023 | Moore | B60G 11/02 |
| 2002/0100637 A1 | 8/2002 | Stringer et al. | |
| 2002/0117345 A1 | 8/2002 | Sztykiel et al. | |
| 2003/0158635 A1 | 8/2003 | Pillar et al. | |
| 2003/0195680 A1 | 10/2003 | Pillar | |
| 2004/0133319 A1 | 7/2004 | Pillar et al. | |
| 2004/0155426 A1 | 8/2004 | Wen et al. | |
| 2005/0234622 A1 | 10/2005 | Pillar et al. | |
| 2005/0236226 A1 | 10/2005 | Salmi et al. | |
| 2005/0236824 A1 | 10/2005 | Wissler et al. | |
| 2005/0247524 A1 | 11/2005 | Wissler et al. | |
| 2005/0253344 A1 | 11/2005 | Trinkner et al. | |
| 2006/0021764 A1 | 2/2006 | Archer et al. | |
| 2006/0022001 A1 | 2/2006 | Linsmeier et al. | |
| 2006/0032701 A1 | 2/2006 | Linsmeier et al. | |
| 2006/0032702 A1 | 2/2006 | Linsmeier et al. | |
| 2006/0065411 A1 | 3/2006 | Linsmeier et al. | |
| 2006/0070845 A1 | 4/2006 | Crookston | |

(56) References Cited

U.S. PATENT DOCUMENTS

| | | |
|---|---|---|
| 2006/0086566 A1 | 4/2006 | Linsmeier et al. |
| 2006/0213672 A1 | 9/2006 | Mohr |
| 2007/0034389 A1 | 2/2007 | Relyea et al. |
| 2007/0187434 A1 | 8/2007 | Schrafel |
| 2007/0205053 A1 | 9/2007 | Isham et al. |
| 2007/0256842 A1 | 11/2007 | Mohr |
| 2007/0284156 A1 | 12/2007 | Grady et al. |
| 2007/0286736 A1 | 12/2007 | Grady et al. |
| 2008/0059030 A1 | 3/2008 | Quigley et al. |
| 2008/0063498 A1 | 3/2008 | Lambert et al. |
| 2008/0099212 A1 | 5/2008 | Do |
| 2008/0099213 A1 | 5/2008 | Morrow et al. |
| 2008/0103651 A1 | 5/2008 | Pillar et al. |
| 2008/0215700 A1 | 9/2008 | Pillar et al. |
| 2008/0271901 A1 | 11/2008 | Decker |
| 2009/0096231 A1 | 4/2009 | Burlingame |
| 2009/0101436 A1 | 4/2009 | Burman et al. |
| 2009/0218108 A1 | 9/2009 | Cano |
| 2010/0200328 A1 | 8/2010 | Savard et al. |
| 2012/0193109 A1 | 8/2012 | Moore et al. |
| 2014/0048353 A1 | 2/2014 | Ellis |
| 2014/0238704 A1 | 8/2014 | Moore et al. |
| 2014/0262355 A1 | 9/2014 | Linsmeier |
| 2014/0334169 A1 | 11/2014 | Ewert |
| 2015/0096835 A1 | 4/2015 | Hong et al. |
| 2015/0120152 A1 | 4/2015 | Lauterjung et al. |
| 2015/0273252 A1 | 10/2015 | Lenz et al. |
| 2015/0273253 A1 | 10/2015 | Lenz et al. |
| 2016/0144209 A1 | 5/2016 | Moore |
| 2016/0144210 A1 | 5/2016 | Betz et al. |
| 2017/0050063 A1 | 2/2017 | Shively et al. |
| 2017/0056695 A1 | 3/2017 | Moore |
| 2017/0101297 A1 | 4/2017 | Claypool |
| 2017/0182340 A1 | 6/2017 | Moore |
| 2017/0252583 A1 | 9/2017 | Goeltz |
| 2018/0064973 A1 | 3/2018 | Moore |
| 2018/0072550 A1 | 3/2018 | Clark et al. |
| 2018/0221694 A1 | 8/2018 | Shively et al. |
| 2019/0015692 A1 | 1/2019 | Fieber et al. |
| 2019/0175971 A1 | 6/2019 | Moore et al. |
| 2019/0209881 A1 | 7/2019 | Wroblewski et al. |
| 2019/0224516 A1 | 7/2019 | Moore et al. |
| 2019/0262643 A1 | 8/2019 | Shively et al. |
| 2020/0039804 A1 | 2/2020 | Betz et al. |

FOREIGN PATENT DOCUMENTS

| | | |
|---|---|---|
| DE | 36 40 944 A1 | 6/1988 |
| EP | 0 244 668 | 11/1987 |
| EP | 2 374 749 A1 | 10/2011 |
| JP | H11-239625 | 9/1999 |
| JP | 2008-297701 | 12/2008 |
| KR | 20110040306 | 4/2011 |
| KR | 101297477 | 8/2013 |
| WO | WO-2016/157245 A1 | 10/2016 |

OTHER PUBLICATIONS

U.S. Appl. No. 09/123,804, filed Jul. 28, 1998, Archer et al.
U.S. Appl. No. 09/364,690, filed Jul. 30, 1999, Kempen et al.
U.S. Appl. No. 10/171,075, filed Jun. 13, 2002, Archer et al.
U.S. Appl. No. 29/162,282, filed Jun. 13, 2002, Archer et al.
U.S. Appl. No. 29/162,344, filed Jun. 13, 2002, Archer et al.
Aerial ladders brochure published by Pierce Manufacturing Inc. prior to the effective filing date of the present application.
Anonymous, "New truck for Lincolnshire-Riverwoods," Chicago Area Fire Departments, Dec. 6, 2010, Retrieved from the Internet at http://chicagoareafire.com/blog/2010/12/06/, 5 pages as printed.
Anonymous, "Problems with single axle aerial trucks," Firehouse, Dec. 2, 2009, Retrieved from the Internet at http://www.firehouse.com/forums/t111822/, 15 pages as printed.
Anonymous, "Raptor Aerials," Rosenbauer, Oct. 2, 2014, Retrieved from the Internet at https://web.archive.org/web/20101224225128/http://rosenbaueramerica.com/media/documents/pdf/raptor_eng.pdf, 6 pages as printed.
Anonymous, "Viper Aerials," Rosenbauer, Oct. 2, 2014, Retrieved from the Internet at https://web.archive.org/web/20141002023939/http://rosenbaueramerica.com/media/documents/pdf/viper_eng.pdf, 8 pages as printed.
Defendants' amended invalidity contentions regarding the claims of parent U.S. Pat. No. 9,597,536 and U.S. Pat. No. 9,814,915.
Defendants' claim construction brief regarding the claims of parent U.S. Pat. No. 9,597,536 and U.S. Pat. No. 9,814,915.
Defendants' invalidity contentions regarding the claims of parent U.S. Pat. No. 9,597,536 and U.S. Pat. No. 9,814,915.
Defendants' motion to dissolve the preliminary injunction based on parent U.S. Pat. No. 9,597,536 and U.S. Pat. No. 9,814,915.
Defendants' objections to the report and recommendation in favor of plaintiffs' motion for a preliminary injunction based on parent U.S. Pat. No. 9,597,536 and U.S. Pat. No. 9,814,915.
Defendants' opposition to plaintiffs' motion for a preliminary injunction based on parent U.S. Pat. No. 9,597,536 and U.S. Pat. No. 9,814,915.
Defendants' opposition to plaintiffs' renewed motion for judgment as a matter of law regarding the validity of claim 20 of parent U.S. Pat. No. 9,597,536.
Defendants' supplemental invalidity contentions regarding the claims of parent U.S. Pat. No. 9,597,536 and U.S. Pat. No. 9,814,915.
Documentation regarding a Pierce Manufacturing Inc. fire apparatus including a medium duty ladder delivered to Falcon Heights, MN Fire Department prior to the effective filing date of the present application.
Documentation regarding a Rosenbauer fire apparatus purportedly delivered to Hinsdale, IL Fire Department prior to the effective filing date of the present application, including photographs purportedly taken in 2019 and purportedly showing 750 pounds of weight hanging from the distal end of the ladder of the fire apparatus.
Documentation regarding a Seagrave fire apparatus purportedly delivered to Essex, MA Fire Department prior to the effective filing date of the present application.
Documentation regarding a Seagrave fire apparatus purportedly delivered to Mt. Washington, KY Fire Department prior to the effective filing date of the present application.
Documentation regarding Inter Partes Review and Denial to Institute Inter Partes Review of U.S. Pat. No. 9,597,536 (IPR2019-00161).
Documentation regarding Inter Partes Review and Denial to Institute Inter Partes Review of U.S. Pat. No. 9,814,915 (IPR2019-00162).
Documentation regarding Rosenbauer Raptor 102' aerial ladder purportedly available prior to the effective filing date of the present application.
Documents regarding the appeal and affirmation of the preliminary injunction based on parent U.S. Pat. No. 9,597,536 and U.S. Pat. No. 9,814,915.
Emergency Vehicle Size and Weight Regulation Guide available as early as Nov. 2011.
Excerpt from Larry Shapiro, Aerial Fire Trucks, 2002, MBI Publishing Company, St. Paul, MN.
Expert Report of Dr. Joseph Rakow regarding invalidity of parent U.S. Pat. No. 9,597,536 and U.S. Pat. No. 9,814,915.
International Preliminary Report on Patentability on PCT/US2015/059984, dated May 30, 2017, 7 pages.
International Preliminary Report on Patentability on PCT/US2015/060034, dated May 30, 2017, 8 pages.
International Preliminary Report on Patentability on PCT/US2015/060035, dated May 30, 2017, 10 pages.
International Preliminary Report on Patentability on PCT/US2015/060036, dated May 30, 2017, 10 pages.
International Preliminary Report on Patentability on PCT/US2015/060038, dated May 30, 2017, 9 pages.
International Preliminary Report on Patentability on PCT/US2015/060040, dated May 30, 2017, 10 pages.

(56) References Cited

OTHER PUBLICATIONS

International Search Report and Written Opinion on PCT/US2015/059984, dated Feb. 10, 2016, 11 pages.
International Search Report and Written Opinion on Application No. PCT/US2018/015504, mail date May 29, 2018, 18 pages.
International Search Report and Written Opinion on PCT/US2015/060034, dated Feb. 4, 2016, 12 pages.
International Search Report and Written Opinion on PCT/US2015/060035, dated Feb. 10, 2016, 16 pages.
International Search Report and Written Opinion on PCT/US2015/060036, dated Feb. 9, 2016, 14 pages.
International Search Report and Written Opinion on PCT/US2015/060038, dated Feb. 22, 2016, 16 pages.
International Search Report and Written Opinion on PCT/US2015/060040, dated Feb. 9, 2016, 15 pages.
KME 109' Aerialcat tandem rear axle fire apparatus brochure purportedly published by KME prior to the effective filing date of the present application.
Medium duty ladder information sheet published by Pierce Manufacturing Inc. and available as early as of May 2006.
Metz aerial ladder instruction manual purportedly published prior to the effective filing date of the present application-2.
Metz aerial ladder instruction manual purportedly published prior to the effective filing date of the present application.
Order denying plaintiffs' renewed motion for judgement of a matter of law regarding the validity of claim 20 of parent U.S. Pat. No. 9,597,536.
Order granting plaintiffs' motion for a preliminary injunction based on parent U.S. Pat. No. 9,597,536 and U.S. Pat. No. 9,814,915.
Order regarding the construction of the claims of parent U.S. Pat. No. 9,597,536 and U.S. Pat. No. 9,814,915.
Plaintiffs' claim construction brief regarding the claims of parent U.S. Pat. No. 9,597,536 and U.S. Pat. No. 9,814,915.
Plaintiffs' motion for a preliminary injunction based on parent U.S. Pat. No. 9,597,536 and U.S. Pat. No. 9,814,915.
Plaintiffs' opposition to defendants' motion to dissolve the preliminary injunction based on parent U.S. Pat. No. 9,597,536 and U.S. Pat. No. 9,814,915.
Plaintiffs' renewed motion for judgment as a matter of law regarding the validity of claim 20 of parent U.S. Pat. No. 9,597,536.
Plaintiffs' reply in support of plaintiffs' motion for a preliminary injunction based on parent U.S. Pat. No. 9,597,536 and U.S. Pat. No. 9,814,915.
Plaintiffs' response to defendants' objections to the report and recommendation in favor of plaintiffs' motion for a preliminary injunction based on parent U.S. Pat. No. 9,597,536 and U.S. Pat. No. 9,814,915.
Report and recommendation in favor of plaintiffs' motion for a preliminary injunction based on parent U.S. Pat. No. 9,597,536 and U.S. Pat. No. 9,814,915.
Rosenbauer Raptor aerial ladder brochure purportedly published by Rosenbauer prior to the effective filing date of the present application.
Rosenbauer, "Raptor Aerials", Oct. 2, 2014, 6 pages.
Transcript of trial proceedings (Case No. 8:18-CV-617) on Jun. 11, 2021 relating to parent U.S. Pat. No. 9,597,536 and U.S. Pat. No. 9,814,915.
Transcript of trial proceedings (Case No. 8:18-CV-617) on Jun. 14, 2021 relating to parent U.S. Pat. No. 9,597,536 and U.S. Pat. No. 9,814,915.

\* cited by examiner

QUINT CONFIGURATION FIRE APPARATUS

CROSS-REFERENCE TO RELATED PATENT APPLICATIONS

This application (a) is a continuation of U.S. patent application Ser. No. 17/029,706, filed Sep. 23, 2020, which is a continuation of U.S. patent application Ser. No. 16/779,897, filed Feb. 3, 2020, which is a continuation of U.S. patent application Ser. No. 15/811,241, filed Nov. 13, 2017, which is a continuation of U.S. patent application Ser. No. 15/460,901, filed Mar. 16, 2017, now U.S. Pat. No. 9,814,915, which is a continuation of U.S. patent application Ser. No. 15/351,417, filed Nov. 14, 2016, now U.S. Pat. No. 9,597,536, which is a continuation of U.S. patent application Ser. No. 14/552,252, filed Nov. 24, 2014, now U.S. Pat. No. 9,504,863, and (b) is related to U.S. patent application Ser. No. 15/089,137, filed Apr. 1, 2016, now U.S. Pat. No. 9,580,960, which is a continuation of U.S. patent application Ser. No. 14/552,240, filed Nov. 24, 2014, now U.S. Pat. No. 9,677,334; U.S. patent application Ser. No. 14/552,293, filed Nov. 24, 2014, now U.S. Pat. No. 9,580,962; U.S. patent application Ser. No. 14/552,283, filed Nov. 24, 2014, now U.S. Pat. No. 9,492,695; U.S. patent application Ser. No. 14/552,260, filed Nov. 24, 2014, now U.S. Pat. No. 9,302,129; and U.S. patent application Ser. No. 14/552,275, filed Nov. 24, 2014, now U.S. Pat. No. 9,579,530, all of which are incorporated herein by reference in their entireties.

BACKGROUND

A quint configuration fire apparatus (e.g., a fire truck, etc.) includes an aerial ladder, a water tank, ground ladders, a water pump, and hose storage. Aerial ladders may be classified according to their horizontal reach and vertical extension height. Traditionally, weight is added to the fire apparatus (e.g., by making the various components heavier or larger, etc.) in order to increase the horizontal reach or vertical extension height of the aerial ladder. Traditional quint configuration fire trucks have included a second rear axle to carry the weight required to provide the desired aerial ladder horizontal reach and vertical extension height. Such vehicles can therefore be more heavy, difficult to maneuver, and expensive to manufacture.

SUMMARY

One embodiment relates to a quint configuration fire apparatus. The quint configuration fire apparatus includes a chassis defining a longitudinal axis, a single front axle coupled to the chassis, a single rear axle coupled to the chassis where the single rear axle has a gross axle weight rating of less than or equal to 33,500 pounds, a body coupled to the chassis and body having storage configured to receive a ground ladder and a fire hose, a pump supported by the chassis, a water tank supported by the chassis, a ladder assembly having a proximal end supported by the chassis, and a stability system. The ladder assembly is extendable to a horizontal reach of at least 90 feet and a vertical height of at least 95 feet. The ladder assembly is configured to support a tip load of at least 750 pounds. The stability system includes (a) two stabilizers positioned between the single front axle and the single rear axle and (b) at least a third stabilizer positioned rearward of the single rear axle. Two stabilizers are offset relative to one another along the longitudinal axis. The two stabilizers are configured to protrude from opposing lateral sides in a direction perpendicular to the longitudinal axis. The combination of (a) a center of gravity of at least one of the chassis, the body, the pump, or the water tank with (b) the stability system is configured to counterbalance the tip load of at least 750 pounds applied to a distal end of the ladder assembly while the ladder assembly is (a) extended to the horizontal reach of at least 90 feet and (b) rotated between a plurality of operating orientations.

Another embodiment relates to a quint configuration fire apparatus. The quint configuration fire apparatus includes a chassis defining a longitudinal axis, a single front axle, a single rear axle, a body having storage configured to receive a ground ladder and a fire hose, a pump, a water tank, a ladder assembly, and a stability system. The ladder assembly is extendable to a vertical height of at least 95 feet. The stability system includes two stabilizers positioned between the single front axle and the single rear axle. The two stabilizers are offset relative to one another along the longitudinal axis. The two stabilizers are configured to protrude from opposing lateral sides in a direction perpendicular to the longitudinal axis. The combination of (a) a center of gravity of at least one of the chassis, the body, the pump, or the water tank with (b) the stability system counterbalances a tip load of at least 750 pounds applied to a distal end of the ladder assembly when the ladder assembly is (a) extended to a maximum permitted horizontal reach thereof and (b) oriented in each of a plurality of operating orientations.

Another embodiment relates to a quint configuration fire apparatus. The quint configuration fire apparatus includes a chassis, a single front axle, a single rear axle, a body, a pump, a water tank, a ladder assembly sized such that the ladder assembly is physically capable of extending to a vertical height of at least 95 feet, and a stability system including two stabilizers positioned between the single front axle and the single rear axle. The two stabilizers engage a ground surface at a total of two contact points between the single front axle and the single rear axle. The combination of (a) a center of gravity of at least one of the chassis, the body, the pump, or the water tank with (b) the stability system is configured to counterbalance a tip load of at least 750 pounds applied to a distal end of the ladder assembly when the ladder assembly is (a) extended to a maximum permitted horizontal reach thereof and (b) oriented in each of a plurality of operating orientations including at least (i) a forward orientation where the distal end of the ladder assembly extends forward of the body, (ii) a rearward orientation where the distal end of the ladder assembly extends rearward of the body, and (iii) a side orientation where the distal end of the ladder assembly extends to a side of the body.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
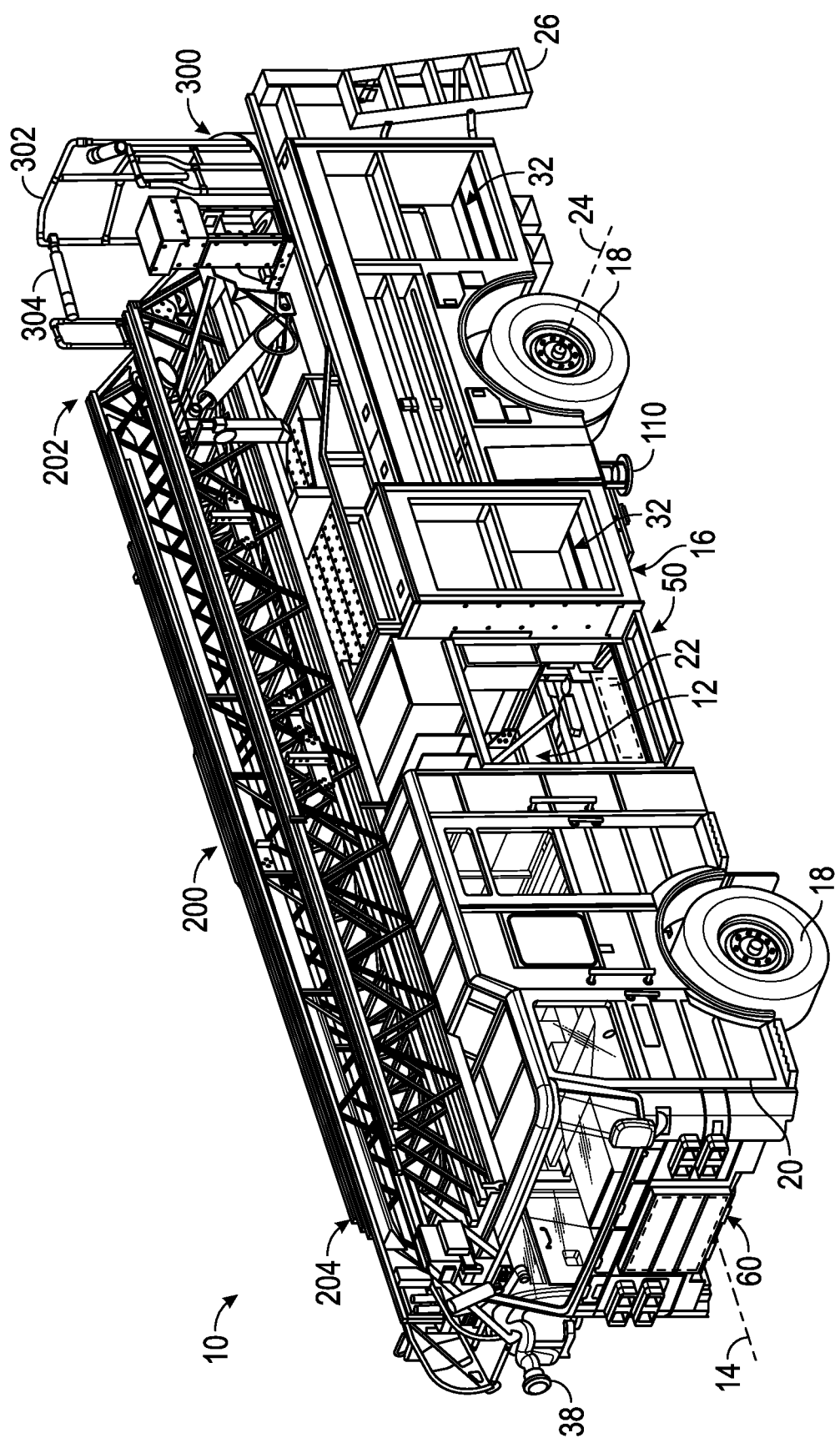
FIG. 1 is a front perspective view of a fire apparatus, according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a quint configuration fire apparatus includes a water tank, an aerial ladder, hose storage, ground ladders, a water pump, and a single rear axle. While some traditional quint configuration fire trucks have a ladder assembly mounted on a single rear axle chassis, the ladder assembly of such fire trucks traditionally has a vertical extension height of 75-80 feet and 67-72 feet of horizontal reach. Vertical extension height may include the distance from the upper-most rung of the ladder assembly to the ground when the ladder assembly is fully extended. Reach may include the horizontal distance from the point of rotation (e.g., point of connection of a ladder assembly to a fire apparatus, etc.) to the furthest rung when the ladder assembly is extended. Increasing vertical extension height or horizontal reach is traditionally achieved by increasing the weight of various components (e.g., the aerial ladder assembly, the turntable, etc.). The increased weight, in turn, is traditionally carried by a requisite tandem rear axle. A tandem rear axle may include two solid axle configurations or may include two pairs of axles (e.g., two pairs of half shafts, etc.) each having a set of constant velocity joints and coupling two differentials to two pairs of hub assemblies. A single rear axle chassis may include one solid axle configuration or may include one pair of axles each having a set of constant velocity joints and coupling a differential to a pair of hub assemblies, according to various alternative embodiments. According to an exemplary embodiment, the aerial ladder assembly of the quint configuration fire apparatus is operable at a vertical extension height of at least 95 feet (e.g., 105 feet, 107 feet, etc.) and at least 90 feet (e.g., at least 100 feet, etc.) of horizontal reach with a tip capacity of at least 750 pounds. The weight of the chassis and other components is supported by a single rear axle chassis, thereby reducing cost and increasing maneuverability relative to traditional vehicles.

According to the exemplary embodiment shown in FIGS. 1-12, a vehicle, shown as a fire apparatus 10, includes a chassis, shown as a frame 12, that defines a longitudinal axis 14. A body assembly, shown as rear section 16, axles 18, and a cab assembly, shown as front cabin 20, are coupled to the frame 12. In one embodiment, the longitudinal axis 14 extends along a direction defined by at least one of a first frame rail 11 and a second frame rail 13 of the frame 12 (e.g., front-to-back, etc.).

Referring to the exemplary embodiment shown in FIG. 1, the front cabin 20 is positioned forward of the rear section 16 (e.g., with respect to a forward direction of travel for the vehicle along the longitudinal axis 14, etc.). According to an alternative embodiment, the cab assembly may be positioned behind the rear section 16 (e.g., with respect to a forward direction of travel for the vehicle along the longitudinal axis 14, etc.). The cab assembly may be positioned behind the rear section 16 on, by way of example, a rear tiller fire apparatus. In some embodiments, the fire apparatus 10 is a ladder truck with a front portion that includes the front cabin 20 pivotally coupled to a rear portion that includes the rear section 16.

Figure 2:
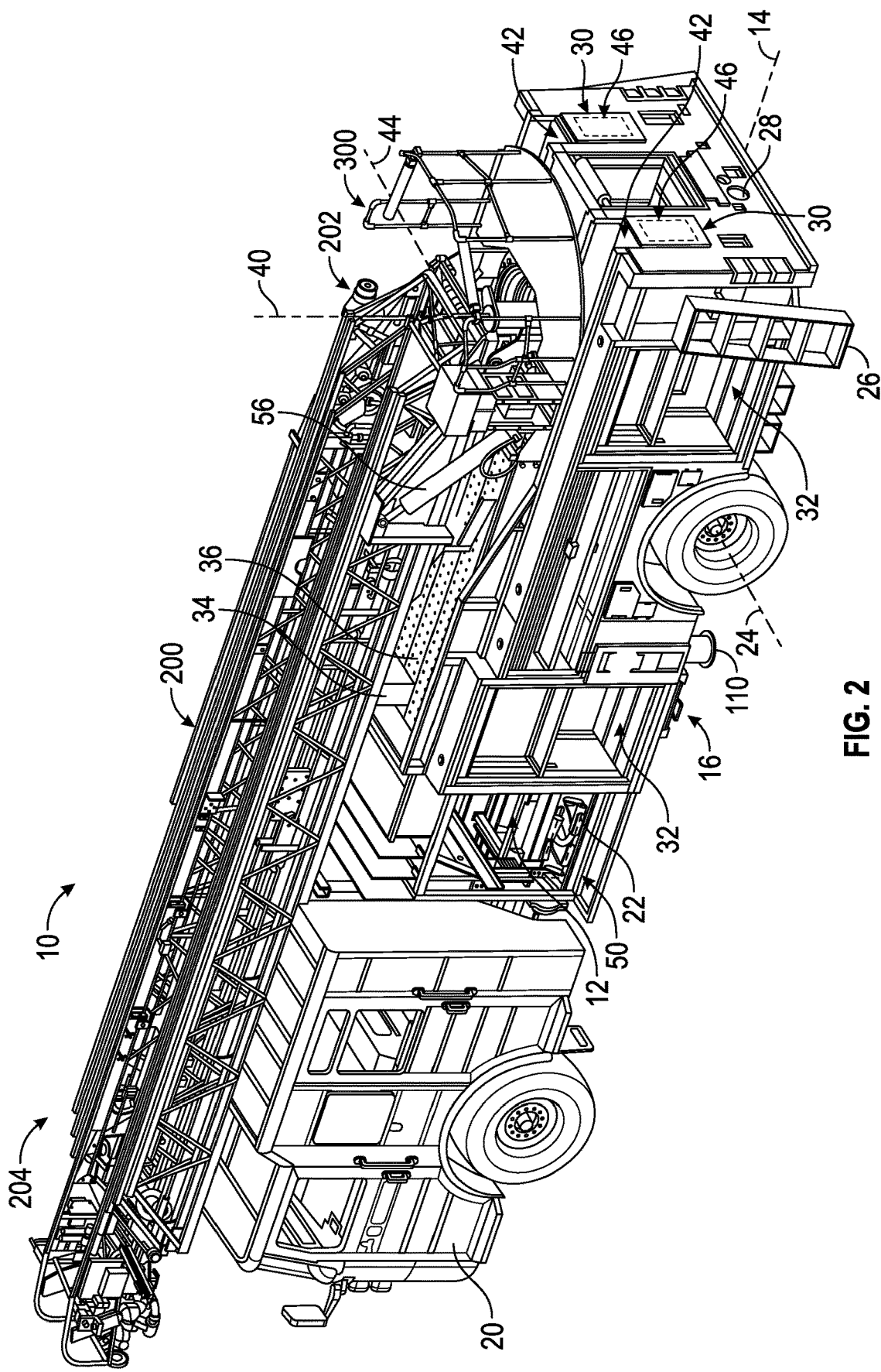
FIG. 2 is a rear perspective view of the fire apparatus of FIG. 1, according to an exemplary embodiment.
Figure 8:
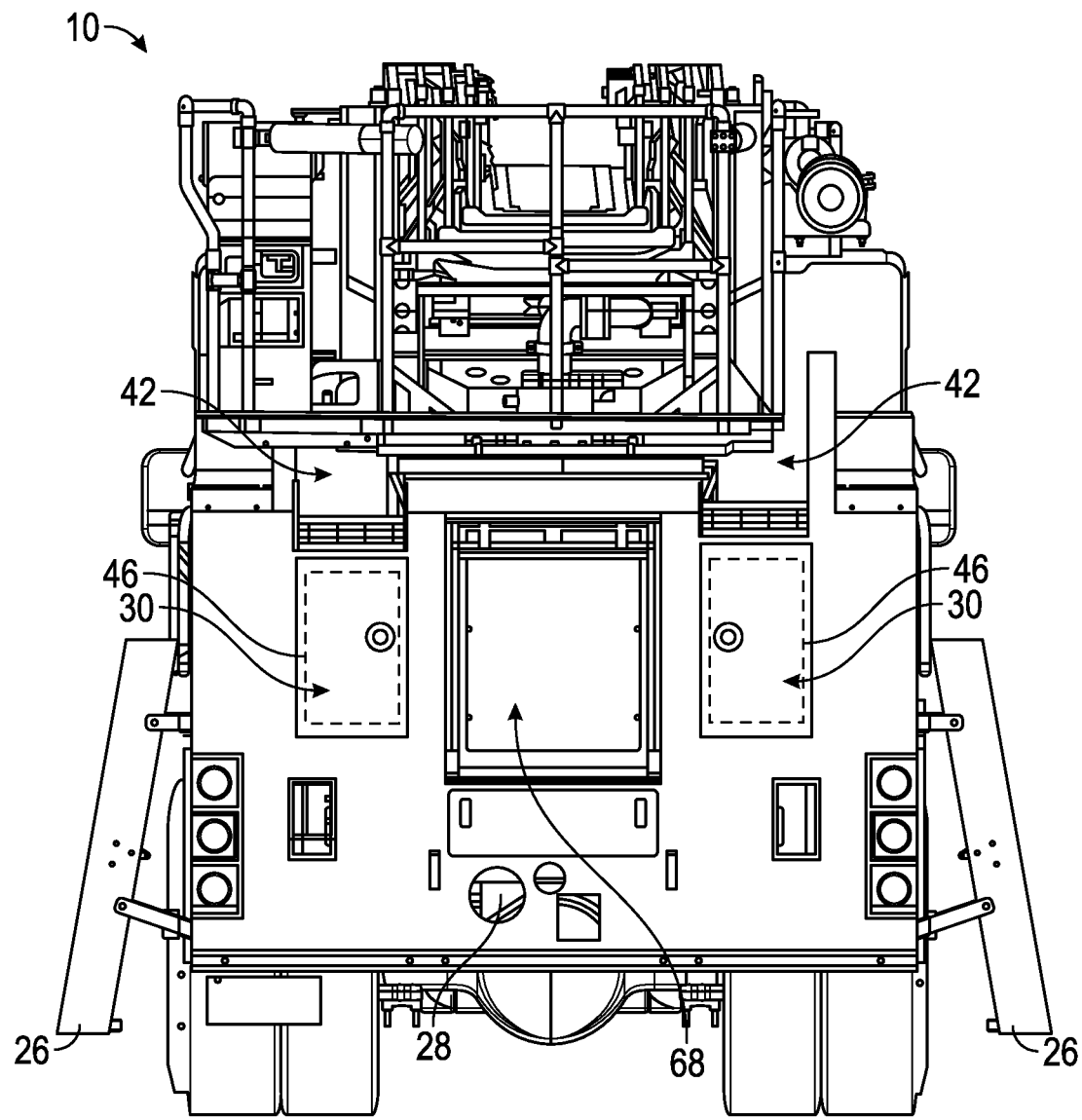
FIG. 8 is a rear view of the fire apparatus of FIG. 1, according to an exemplary embodiment.
Figure 9:
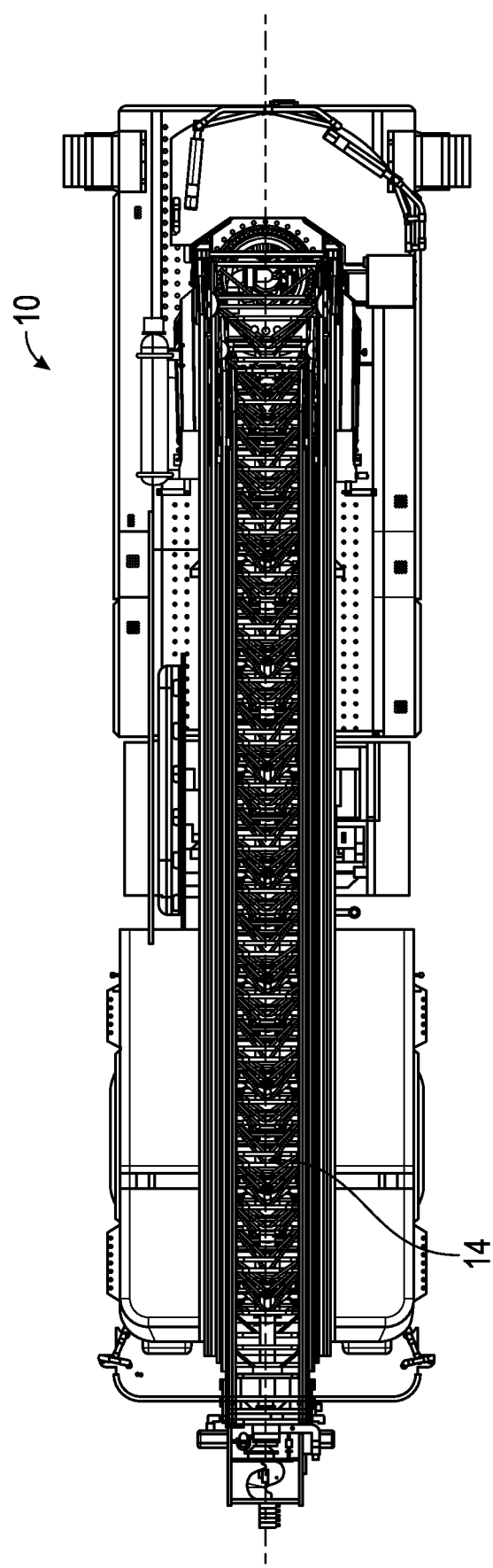
FIG. 9 is a top view of the fire apparatus of FIG. 1, according to an exemplary embodiment.

As shown in FIGS. 2 and 8, the fire apparatus 10 also includes ground ladders 46. The ground ladders 46 are stored within compartments that are closed with doors 30. As shown in FIGS. 2 and 8, the fire apparatus 10 includes two storage compartments and doors 30, each to store one or more individual ground ladders 46. In other embodiments, only one storage compartment and door 30 is included to store one or more ground ladders 46. In still other embodiments, three or more storage compartments and doors 30 are included to store three or more ground ladders 46. As shown in FIGS. 2 and 8, a hose chute 42 is provided on each lateral side at the rear of the fire apparatus 10. The hose chutes 42 define a passageway where one or more hoses may be disposed once pulled from a hose storage location, shown as hose storage platform 36. The fire apparatus 10 includes additional storage, shown as storage compartments 32 and 68, to store miscellaneous items and gear used by emergency response personnel (e.g., helmets, axes, oxygen tanks, medical kits, etc.).

Figure 7:
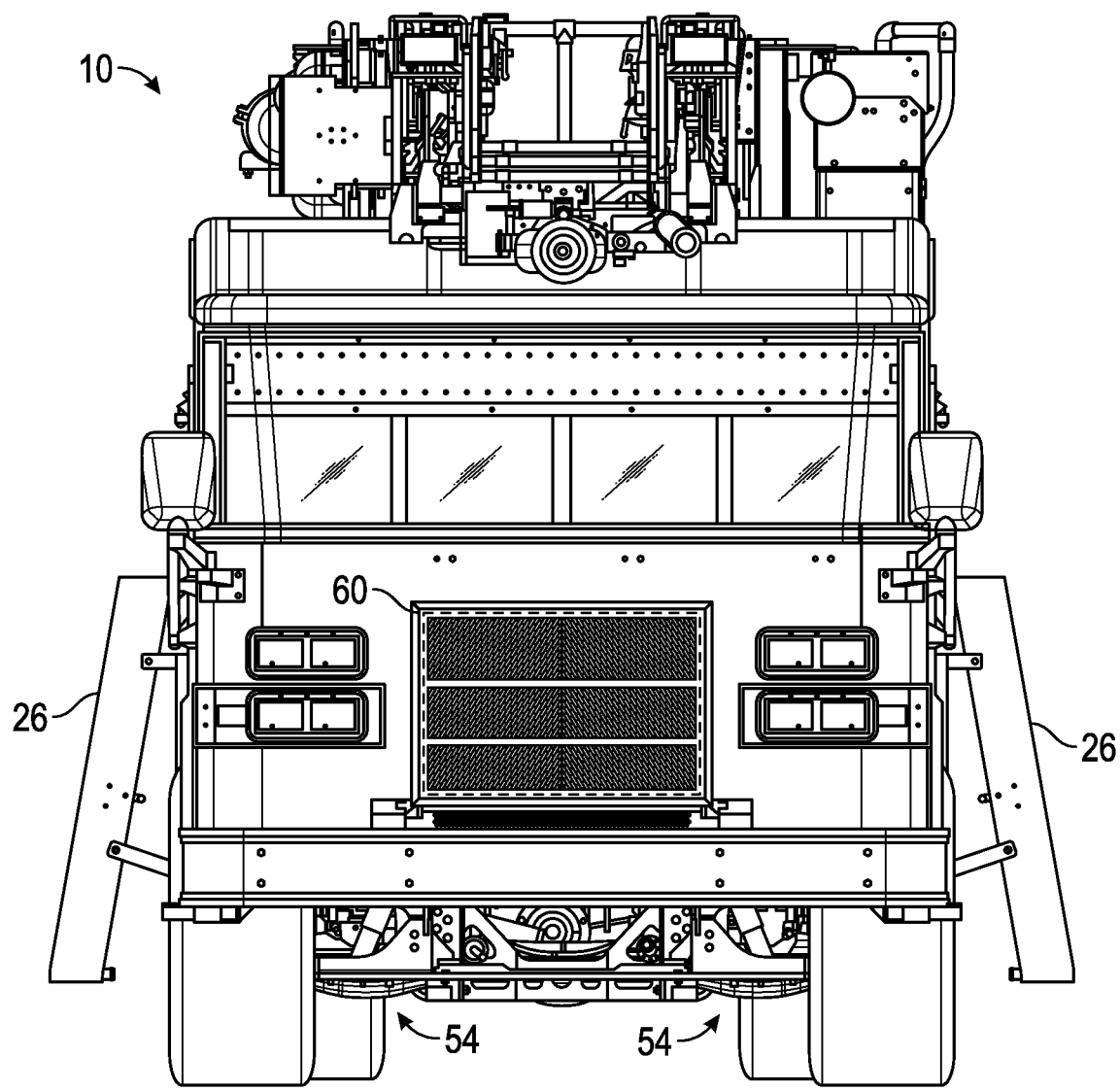
FIG. 7 is a front view of the fire apparatus of FIG. 1, according to an exemplary embodiment.

As shown in FIGS. 1 and 7, the fire apparatus 10 includes an engine 60. In one embodiment, the engine 60 is coupled to the frame 12. According to an exemplary embodiment, the engine 60 receives fuel (e.g., gasoline, diesel, etc.) from a fuel tank and combusts the fuel to generate mechanical energy. A transmission receives the mechanical energy and provides an output to a drive shaft. The rotating drive shaft is received by a differential, which conveys the rotational energy of the drive shaft to a final drive (e.g., wheels, etc.). The final drive then propels or moves the fire apparatus 10. According to an exemplary embodiment, the engine 60 is a compression-ignition internal combustion engine that utilizes diesel fuel. In alternative embodiments, the engine 60 is another type of device (e.g., spark-ignition engine, fuel cell, electric motor, etc.) that is otherwise powered (e.g., with gasoline, compressed natural gas, hydrogen, electricity, etc.).

As shown in FIGS. 1-2, the fire apparatus 10 is a quint configuration fire truck that includes a ladder assembly, shown as aerial ladder assembly 200, and a turntable assembly, shown as turntable 300. The aerial ladder assembly 200 includes a first end 202 (e.g., base end, proximal end, pivot end, etc.) and a second end 204 (e.g., free end, distal end, platform end, implement end, etc.). As shown in FIGS. 1-2, the aerial ladder assembly 200 includes a plurality of ladder sections. In some embodiments, the plurality of sections of the aerial ladder assembly 200 is extendable. An actuator may selectively reconfigure the aerial ladder assembly 200 between an extended configuration and a retracted configuration. By way of example, aerial ladder assembly 200 may include a plurality of nesting sections that telescope with respect to one another. In the extended configuration (e.g., deployed position, use position, etc.), the aerial ladder assembly 200 is lengthened, and the second end 204 is extended away from the first end 202. In the retracted configuration (e.g., storage position, transport position, etc.), the aerial ladder assembly 200 is shortened, and the second end 204 is withdrawn towards the first end 202.

According to an exemplary embodiment, the first end 202 of the aerial ladder assembly 200 is coupled to the frame 12. By way of example, aerial ladder assembly 200 may be directly coupled to frame 12 or indirectly coupled to frame 12 (e.g., with an intermediate superstructure, etc.). As shown in FIGS. 1-2, the first end 202 of the aerial ladder assembly 200 is coupled to the turntable 300. The turntable 300 may be directly or indirectly coupled to the frame 12 (e.g., with an intermediate superstructure, via rear section 16, etc.). As shown in FIG. 1, the turntable 300 includes a railing assembly, shown as hand rails 302, and guard rails, shown as guard rails 304. The hand rails 302 provide support for operators aboard the turntable 300. The guard rails 304 are coupled to the hand rails 302 and provide two entrances to the turntable 300. An operator may provide a force to rotate the guard rails 304 open and gain access to the turntable 300. In the embodiment shown in FIG. 2, the turntable 300 rotates relative to the frame 12 about a generally vertical axis 40. According to an exemplary embodiment, the turntable 300 is rotatable a full 360 degrees relative to the frame 12. In other embodiments, the rotation of the turntable 300 relative to the frame 12 is limited to a range of less than 360 degrees, or the turntable 300 is fixed relative to the frame 12. As shown in FIGS. 1-4, the rear section 16 includes a pair of ladders 26 positioned on opposing lateral sides of the fire apparatus 10. As shown in FIGS. 1-2, the ladders 26 are coupled to the rear section 16 with hinges. An operator (e.g., a fire fighter, etc.) may access the turntable 300 by climbing either one of the ladders 26 and entering through the guard rails 304. According to the exemplary embodiment shown in FIGS. 1-2, the turntable 300 is positioned at the rear end of the rear section 16 (e.g., rear mount, etc.). In other embodiments, the turntable 300 is positioned at the front end of the rear section 16, proximate the front cabin 20 (e.g., mid mount, etc.). In still other embodiments, the turntable 300 is disposed along front cabin 20 (e.g., front mount, etc.).

According to the exemplary embodiment shown in FIGS. 1-2, the first end 202 of the aerial ladder assembly 200 is pivotally coupled to the turntable 300. An actuator, shown as cylinder 56, is positioned to rotate the aerial ladder assembly 200 about a horizontal axis 44. The actuator may be a linear actuator, a rotary actuator, or still another type of device and may be powered hydraulically, electrically, or still otherwise powered. In one embodiment, aerial ladder assembly 200 is rotatable between a lowered position (e.g., the position shown in FIG. 1, etc.) and a raised position. The aerial ladder assembly 200 may be generally horizontal or an angle (e.g., 10 degrees, etc.) below the horizontal when disposed in the lowered position (e.g., a stored position, etc.). In one embodiment, extension and retraction of cylinders 56 rotates aerial ladder assembly 200 about the horizontal axis 44 and raises or lowers, respectively, the second end 204 of aerial ladder assembly 200. In the raised position, the aerial ladder assembly 200 allows access between the ground and an elevated height for a fire fighter or a person being aided by the fire fighter.

Figure 5:
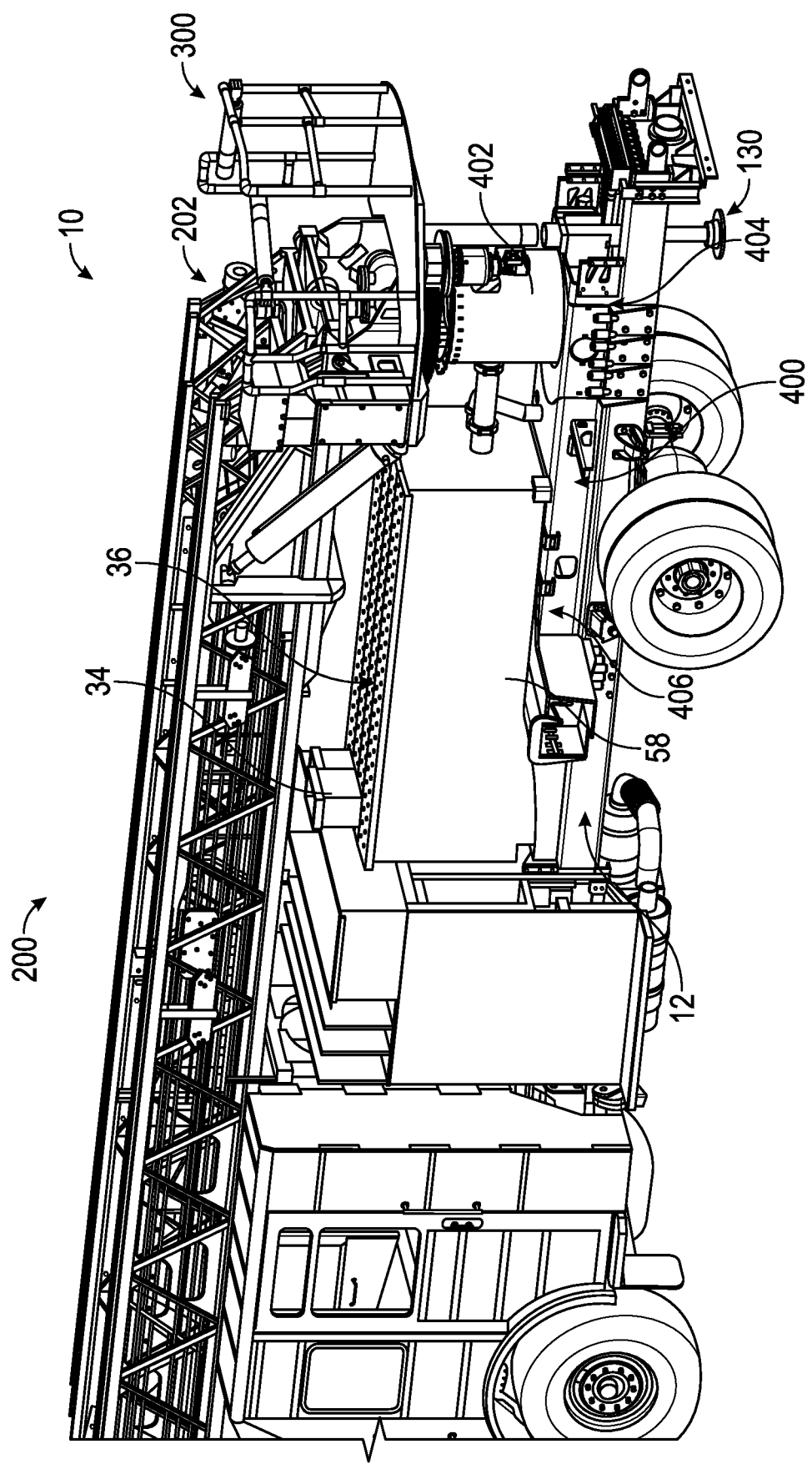
FIG. 5 is a rear perspective view of a water tank of the fire apparatus of FIG. 1, according to an exemplary embodiment.

According to the exemplary embodiment shown in FIG. 5, a reservoir, shown as water tank 58, is coupled to the frame 12 with a superstructure. In one embodiment, the water tank 58 is located within the rear section 16 and below the hose storage platform 36. As shown in FIG. 5, the water tank 58 is coupled to the frame 12 with a tubular component, shown as torque box 400. In one embodiment, the water tank 58 stores at least 500 gallons of water. In other embodiments, the reservoir stores another firefighting agent (e.g., foam, etc.). According to the exemplary embodiment shown in FIGS. 2 and 5, the water tank 58 is filled with a fill dome, shown as fill dome 34.

As shown in FIGS. 1-2, the fire apparatus 10 includes a pump house, shown as pump house 50. A pump 22 may be disposed within the pump house 50. By way of example, the pump house 50 may include a pump panel having an inlet for the entrance of water from an external source (e.g., a fire hydrant, etc.). As shown in FIG. 2, an auxiliary inlet, shown as inlet 28, is provided at the rear of the fire apparatus 10. The pump house 50 may include an outlet configured to engage a hose. The pump 22 may pump fluid through the hose to extinguish a fire (e.g., water from the inlet of the pump house 50, water from the inlet 28, water stored in the water tank 58, etc.).

Referring still to the exemplary embodiment shown in FIGS. 1-2, an implement, shown as nozzle 38 (e.g., deluge gun, water cannon, deck gun, etc.), is disposed at the second end 204 of the aerial ladder assembly 200. The nozzle 38 is connected to a water source (e.g., the water tank 58, an external source, etc.) via an intermediate conduit extending along the aerial ladder assembly 200 (e.g., along the side of the aerial ladder assembly 200, beneath the aerial ladder assembly 200, in a channel provided in the aerial ladder assembly 200, etc.). By pivoting the aerial ladder assembly 200 into the raised position, the nozzle 38 may be elevated to expel water from a higher elevation to facilitate suppressing a fire. In some embodiments, the second end 204 of the aerial ladder assembly 200 includes a basket. The basket may be configured to hold at least one of fire fighters and persons being aided by the fire fighters. The basket provides a platform from which a fire fighter may complete various tasks (e.g., operate the nozzle 38, create ventilation, overhaul a burned area, perform a rescue operation, etc.).

Figure 3:
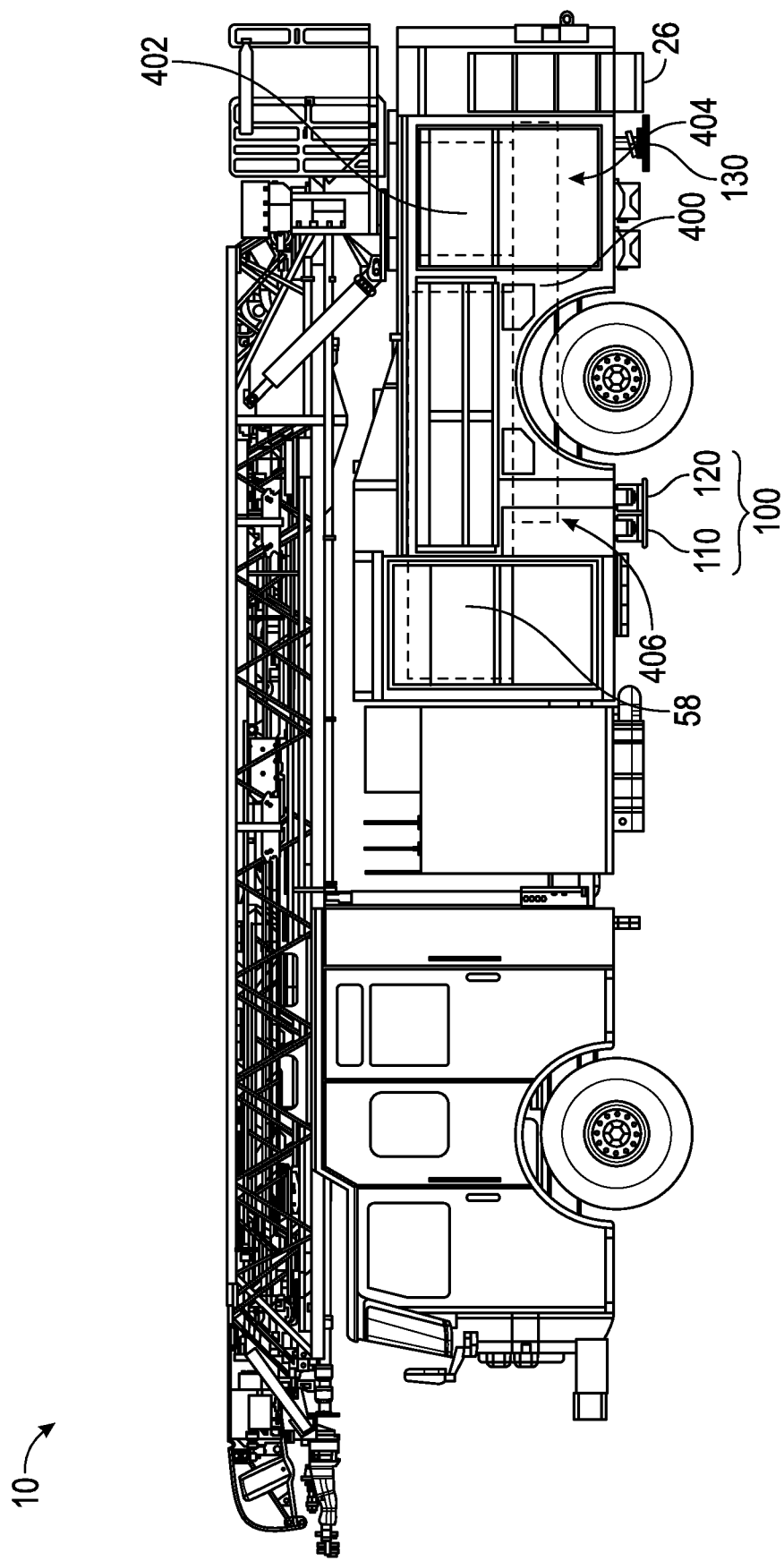
FIG. 3 is a left side view of the fire apparatus of FIG. 1, according to an exemplary embodiment.
Figure 4:
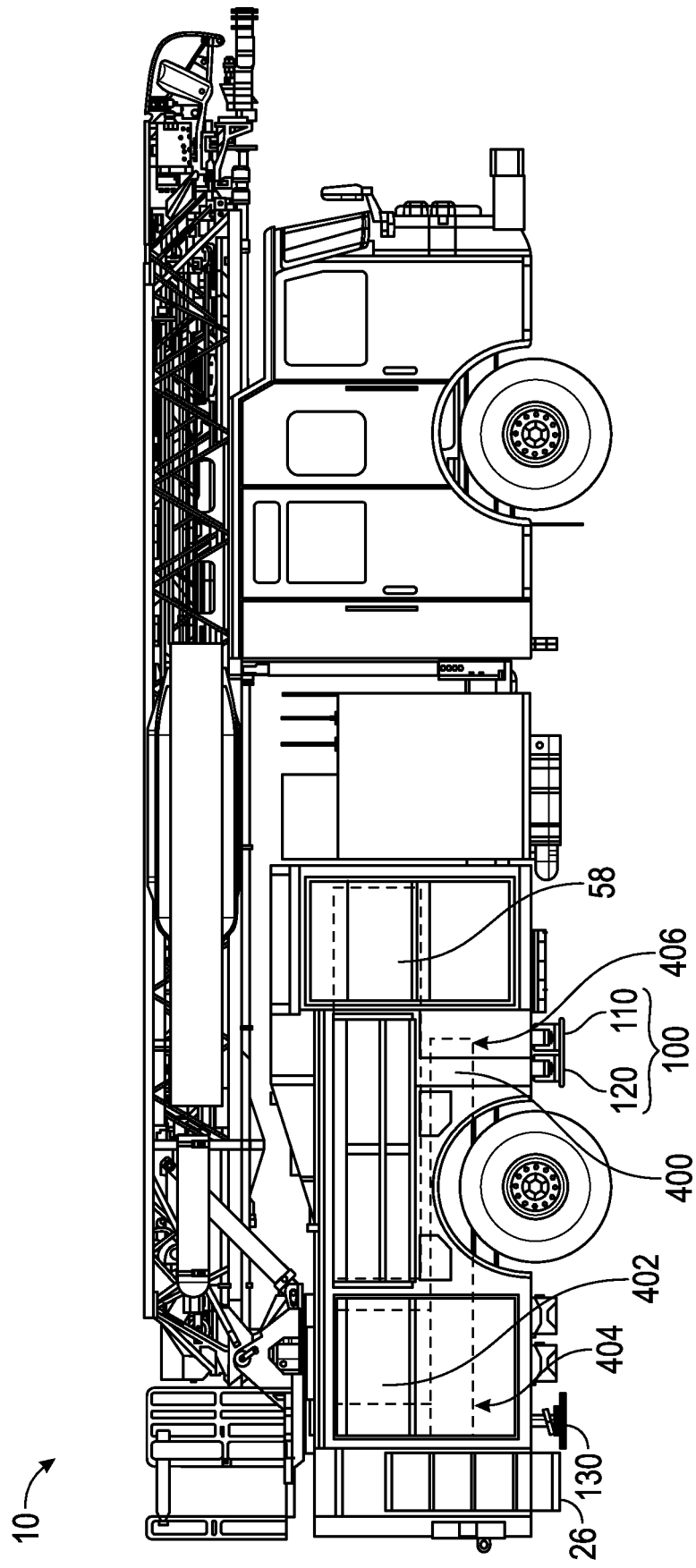
FIG. 4 is a right side view of the fire apparatus of FIG. 1, according to an exemplary embodiment.
Figure 6:
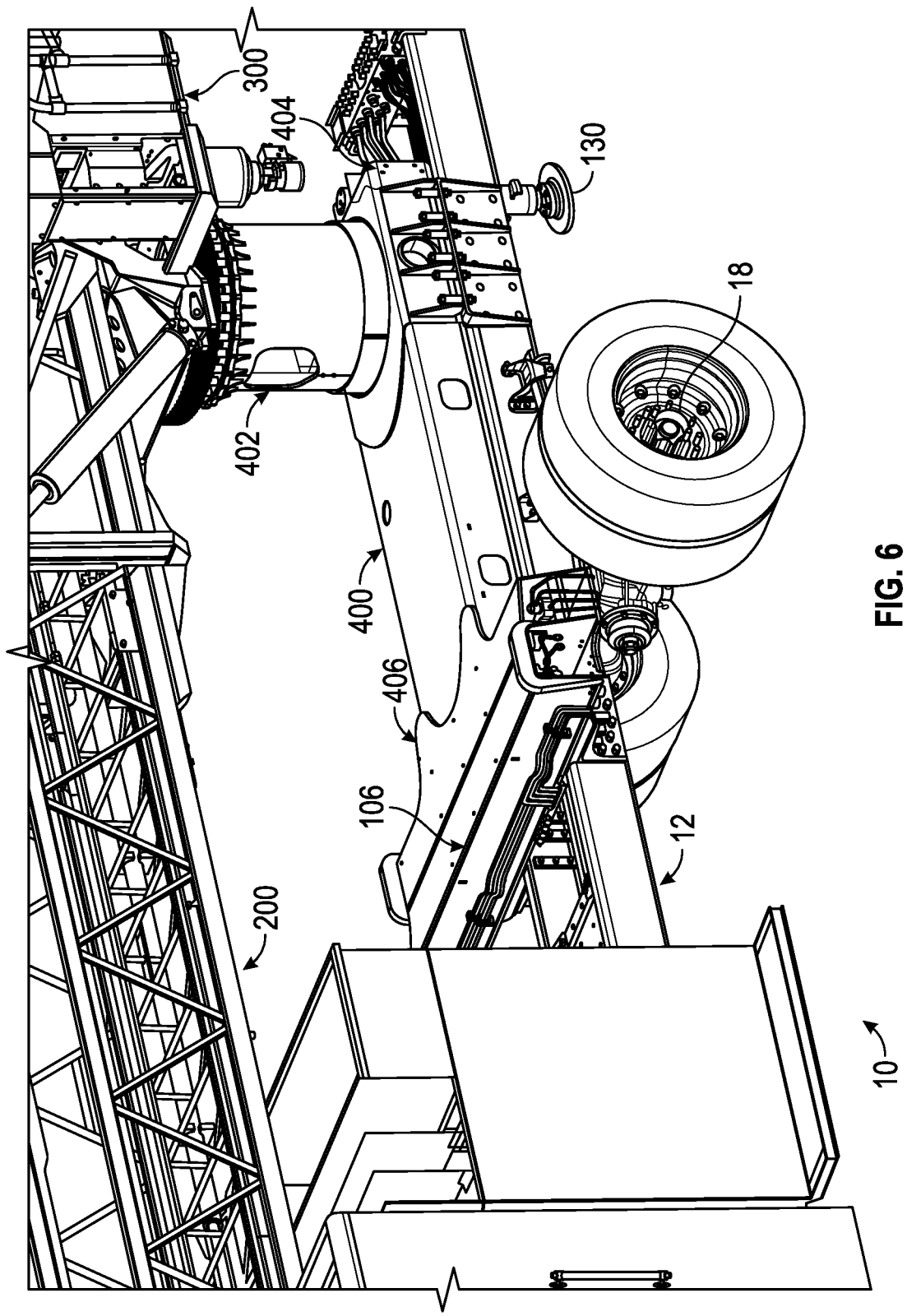
FIG. 6 is a front perspective view of various internal components of the fire apparatus of FIG. 1, according to an exemplary embodiment.

According to the exemplary embodiment shown in FIGS. 5-6, the torque box 400 is coupled to the frame 12. In one embodiment, the torque box 400 extends the full width between the lateral outsides of the first frame rail 11 and the second frame rail 13 of the frame 12. The torque box 400 includes a body portion having a first end 404 and a second end 406. As shown in FIG. 5, a pedestal, shown as pedestal 402, is attached to the first end 404 of the torque box 400. In one embodiment, the pedestal 402 is disposed rearward of (i.e., behind, etc.) the single rear axle 18. The pedestal 402 couples the turntable 300 to the torque box 400. The turntable 300 rotatably couples the first end 202 of the aerial ladder assembly 200 to the pedestal 402 such that the aerial ladder assembly 200 is selectively repositionable into a plurality of operating orientations. According to the exemplary embodiment shown in FIGS. 3-4, a single set of outriggers, shown as outriggers 100, includes a first outrigger 110 and a second outrigger 120. As shown in FIGS. 3-4, the first outrigger 110 and the second outrigger 120 are attached to the second end 406 of the torque box 400 in front of the single rear axle 18 and disposed on opposing lateral sides of the fire apparatus 10. As shown in FIGS. 1-4, the outriggers 100 are moveably coupled to the torque box 400 and may extend outward, away from the longitudinal axis 14, and parallel to a lateral axis 24. According to an exemplary embodiment, the outriggers 100 extend to a distance of eighteen feet (e.g., measured between the center of a pad of the first outrigger 110 and the center of a pad of the second outrigger 120, etc.). In other embodiments, the outriggers 100 extend to a distance of less than or greater than eighteen feet. An actuator may be positioned to extend portions of each of the first outrigger 110 and the second outrigger 120 towards the ground. The actuator may be a linear actuator, a rotary actuator, or still another type of device and may be powered hydraulically, electrically, or still otherwise powered.

According to the exemplary embodiment shown in FIGS. 3-5, a stability foot, shown as stability foot 130, is attached to the first end 404 of the torque box 400. An actuator (e.g., a linear actuator, a rotary actuator, etc.) may be positioned to extend a portion of the stability foot 130 towards the ground. Both the outriggers 100 and the stability foot 130 are used to support the fire apparatus 10 (e.g., while stationary and in use to fight fires, etc.). According to an exemplary embodiment, with the outriggers 100 and stability foot 130 extended, the fire apparatus 10 can withstand a tip capacity of at least 750 pounds applied to the last rung on the second end 204 of the aerial ladder assembly 200 while fully extended (e.g., to provide a horizontal reach of at least 90 feet, to provide a horizontal reach of at least 100 feet, to provide a vertical extension height of at least 95 feet, to provide a vertical extension height of at least 105 feet, to provide a vertical extension height of at least 107 feet, etc.). The outriggers 100 and the stability foot 130 are positioned to transfer the loading from the aerial ladder assembly 200 to the ground. For example, a load applied to the aerial ladder assembly 200 (e.g., a fire fighter at the second end 204, a wind load, etc.) may be conveyed into to the turntable 300, through the pedestal 402 and the torque box 400, and into the ground through at least one of the outriggers 100 and the stability foot 130. While the fire apparatus 10 is being driven or not in use, the actuators of the first outrigger 110, the second outrigger 120, and the stability foot 130 may retract portions of the outriggers 100 and the stability foot 130 into a stored position.

Figure 10:
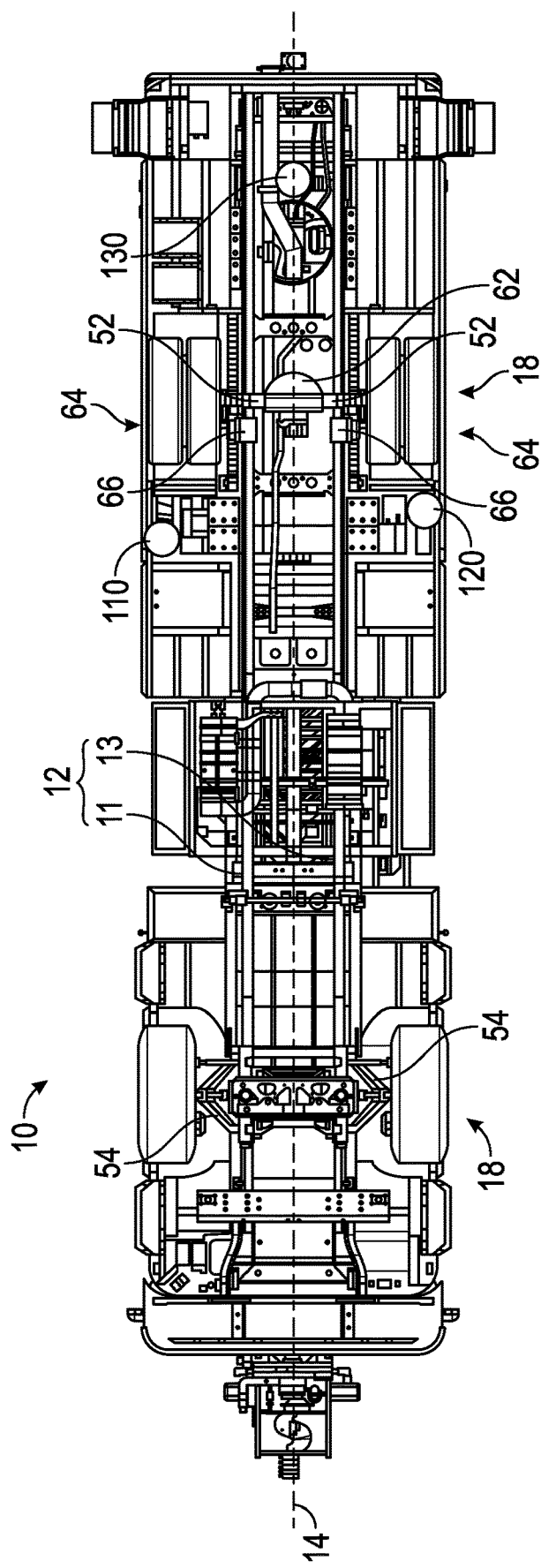
FIG. 10 is a bottom view of the fire apparatus of FIG. 1, according to an exemplary embodiment.
Figure 11:
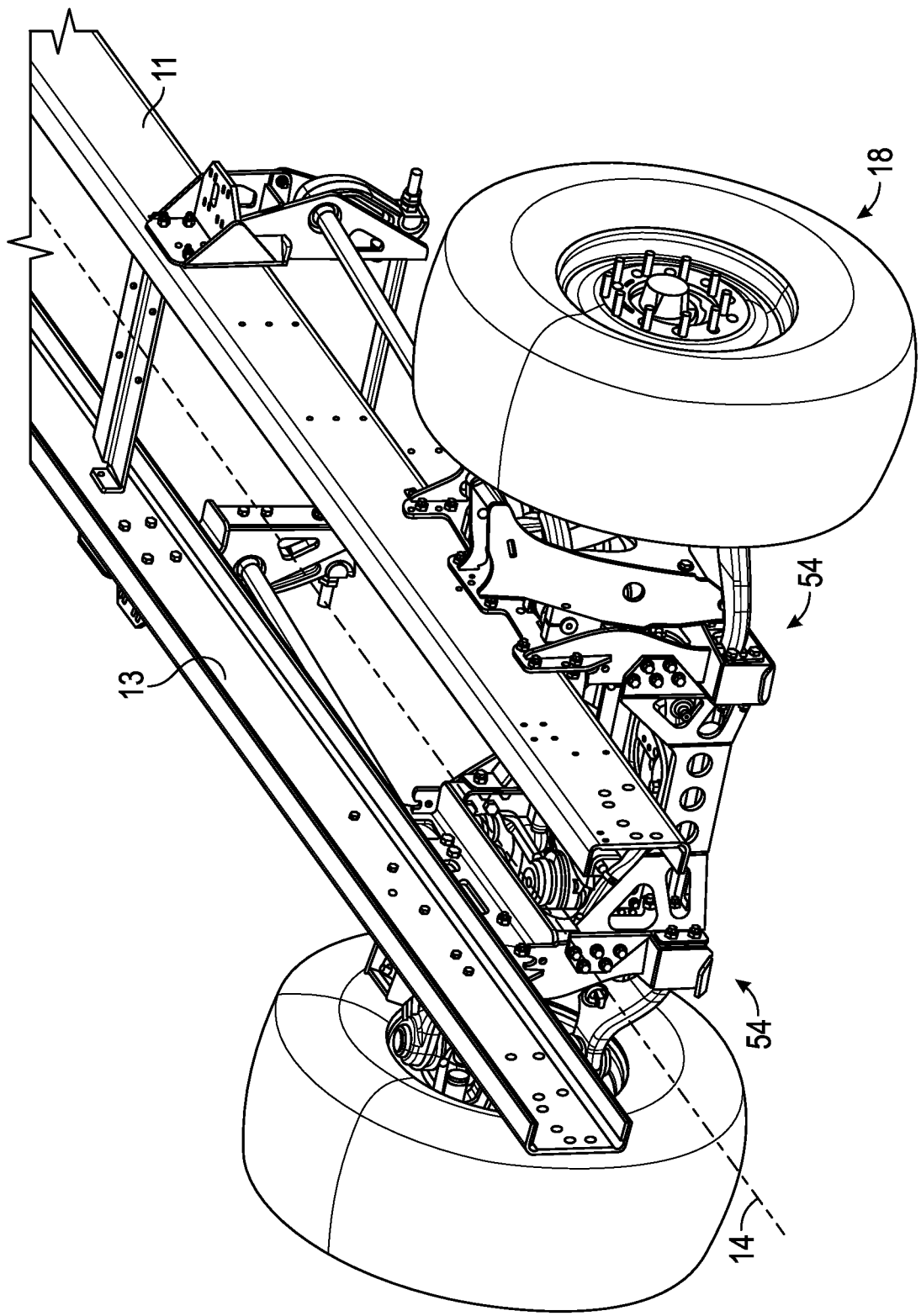
FIG. 11 is a perspective view of a front suspension of the fire apparatus of FIG. 1, according to an exemplary embodiment.
Figure 12:
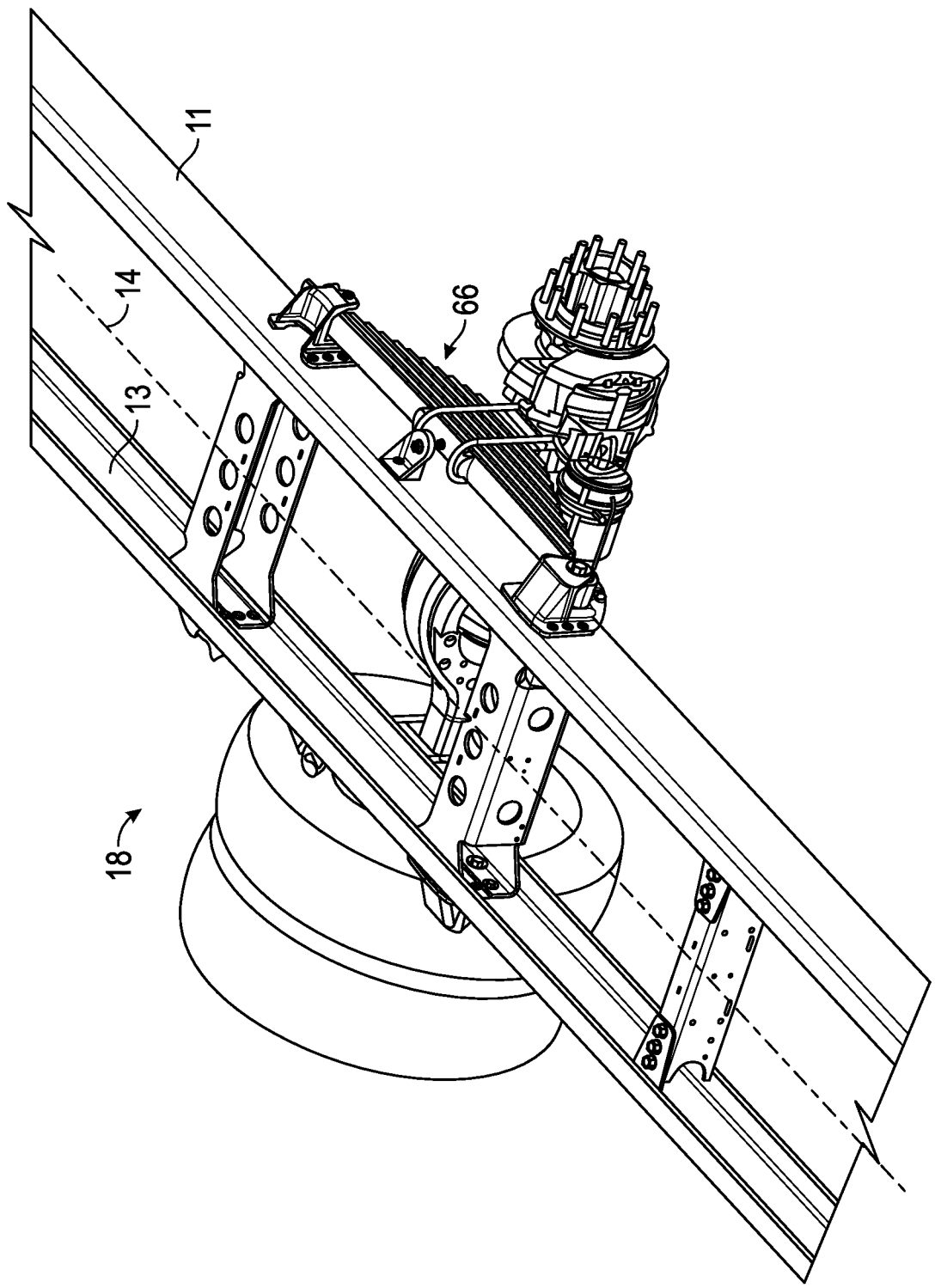
FIG. 12 is a perspective view of a rear suspension of the fire apparatus of FIG. 1, according to an exemplary embodiment.

As shown in FIGS. 10 and 12, the single rear axle 18 includes a differential 62 coupled to a pair of hub assemblies 64 with a pair of axle shaft assemblies 52. As shown in FIGS. 10 and 12, the single rear axle 18 includes a solid axle configuration extending laterally across the frame 12 (e.g., chassis, etc.). A rear suspension, shown as rear suspension 66, includes a pair of leaf spring systems. The rear suspension 66 may couple the single solid axle configuration of the single rear axle 18 to the frame 12. In one embodiment, the single rear axle 18 has a gross axle weight rating of no more than (i.e., less than or equal to, etc.) 33,500 pounds. In other embodiments, a first axle shaft assembly 52 has a first set of constant velocity joints and a second axle shaft assembly 52 has a second set of constant velocity joints. The first axle assembly 52 and the second axle assembly 52 may extend from opposing lateral sides of the differential 62, coupling the differential 62 to the pair of hub assemblies 64. As shown in FIGS. 10-11, a front suspension, shown as front suspension 54, for the front axle 18 includes a pair of independent suspension assemblies. In one embodiment, the front axle 18 has a gross axle weight rating of no more than 33,500 pounds.

According to the exemplary embodiment shown in FIGS. 1-12, the aerial ladder assembly 200 forms a cantilever structure when at least one of raised vertically and extended horizontally. The aerial ladder assembly 200 is supported by the cylinders 56 and by the turntable 300 at the first end 202. The aerial ladder assembly 200 supports static loading from its own weight, the weight of any equipment coupled to the ladder (e.g., the nozzle 38, a water line coupled to the nozzle, a platform, etc.), and the weight of any persons using the ladder. The aerial ladder assembly 200 may also support various dynamic loads (e.g., due to forces imparted by a fire fighter climbing the aerial ladder assembly 200, wind loading, loading due to rotation, elevation, or extension of aerial ladder assembly, etc.). Such static and dynamic loads are carried by the aerial ladder assembly 200. The forces carried by the cylinders 56, the turntable 300, and the frame 12 may be proportional (e.g., directly proportional, etc.) to the length of the aerial ladder assembly 200. At least one of the weight of the aerial ladder assembly 200, the weight of the turntable 300, the weight of the cylinders 56, and the weight of the torque box 400 is traditionally increased to increase at least one of the extension height rating, the horizontal reach rating, the static load rating, and the dynamic load rating. Such vehicles traditionally require the use of a chassis having a tandem rear axle. However, the aerial ladder assembly 200 of the fire apparatus 10 has an increased extension height rating and horizontal reach rating without requiring a chassis having a tandem rear axle (e.g., a tandem axle assembly, etc.). According to the exemplary embodiment shown in FIGS. 1-12, the fire apparatus 10 having a single rear axle 18 is lighter, substantially less difficult to maneuver, and less expensive to manufacture than a fire apparatus having a tandem rear axle.

Figure 13:
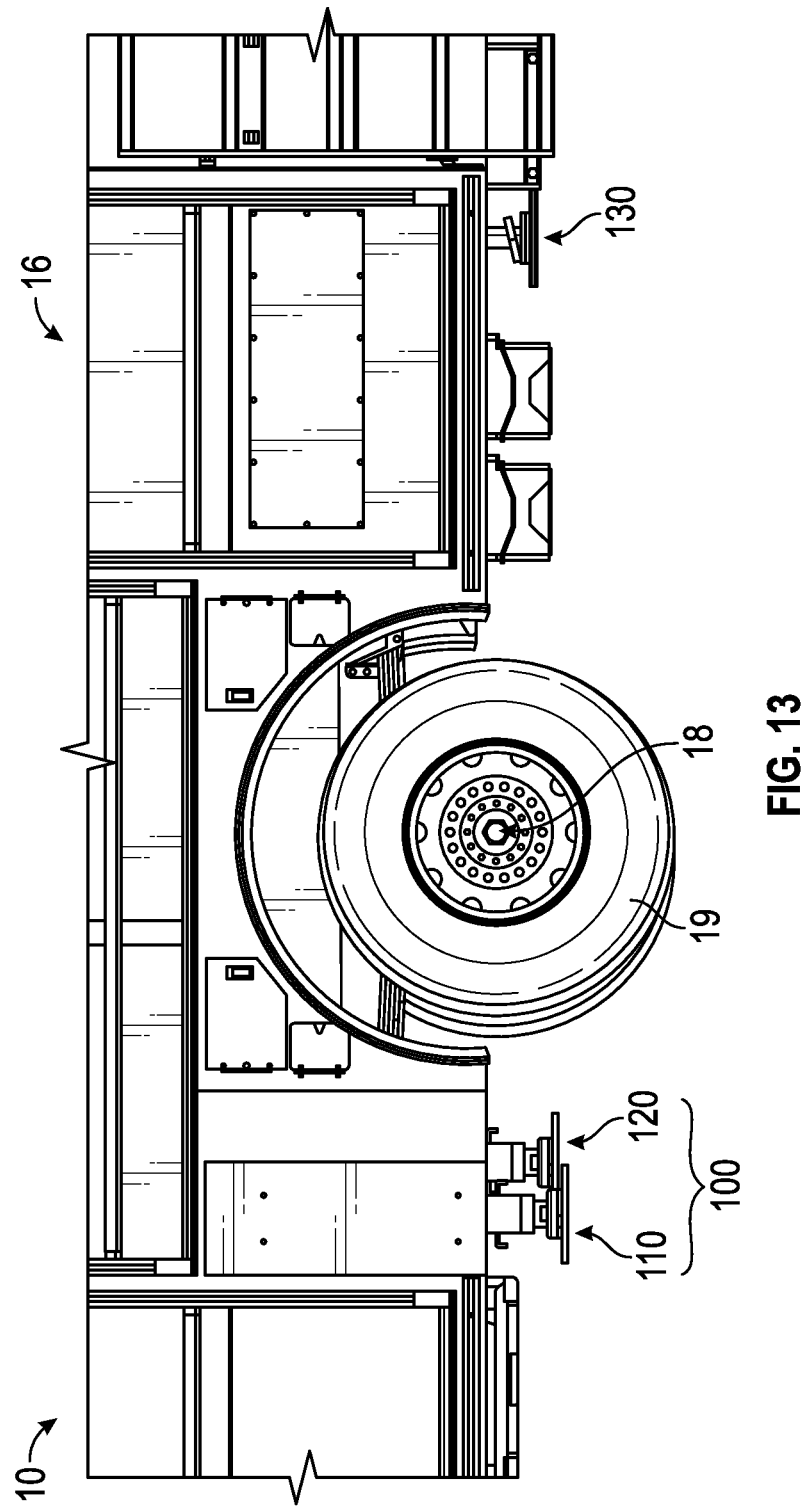
FIG. 13 is a left side view of a single set of outriggers and a stability foot provided with the fire apparatus of FIG. 1, according to an exemplary embodiment.

According to the exemplary embodiment shown in FIGS. 13-21, the first outrigger 110, the second outrigger 120, and the stability foot 130 stabilize the fire apparatus 10 when the aerial ladder assembly 200 is in operation (e.g., being used to extinguish a fire with the nozzle 38, extended to rescue pedestrians from a building, etc.). As shown in FIG. 13, the first outrigger 110, the second outrigger 120, and the stability foot 130 are disposed a stowed position (e.g., not actuated, not extended, etc.). The first outrigger 110, the second outrigger 120, and the stability foot 130 may remain in the stowed position while the fire apparatus 10 is being driven, while the fire apparatus 10 is not in operation (e.g., not being used, parked, etc.), or any other time the aerial ladder assembly 200 is not being utilized during a fire or rescue situation.

Figure 14:
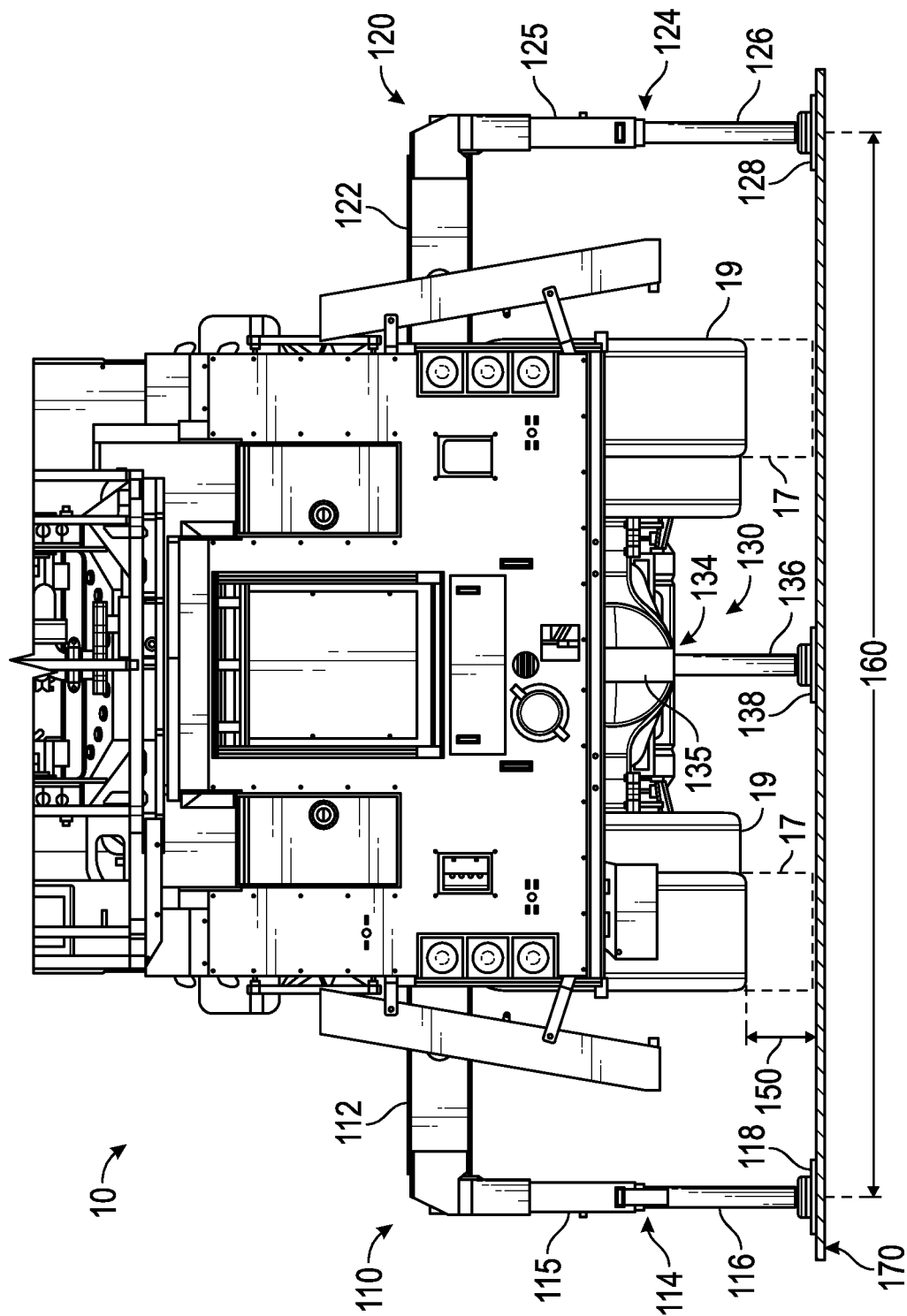
FIG. 14 is a rear view of the single set of outriggers and the stability foot of FIG. 13 in an extended configuration, according to an exemplary embodiment.
Figure 15:
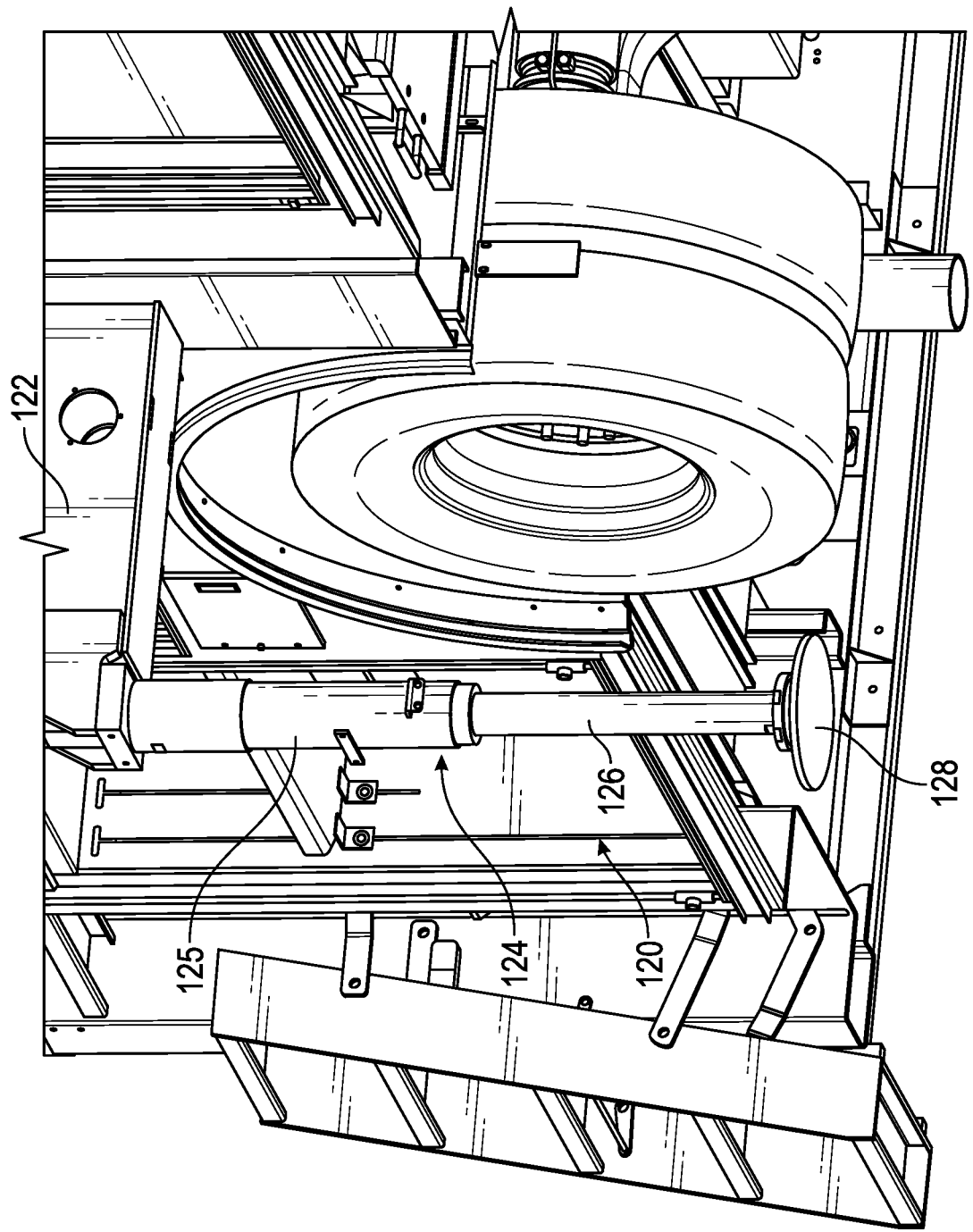
FIG. 15 is a partial view the single set of outriggers of FIG. 13, according to an exemplary embodiment.

As shown in FIGS. 14-15, the first outrigger 110, the second outrigger 120, and the stability foot 130 are disposed in a fully extended position. As shown in FIG. 14, the first outrigger 110 includes a first frame member, shown as first lateral member 112, a first actuator, shown as first cylinder 114, and a first contact pad, shown as first contact pad 118. The first cylinder 114 includes a first cylinder barrel, shown as first cylinder barrel 115, and a first rod, shown as first rod 116. The first rod 116 is coupled to the first contact pad 118. The first cylinder 114 is positioned to extend the first contact pad 118 downward by extending the first rod 116 from the first cylinder barrel 115. The first cylinder 114 extends the first contact pad 118 into contact with a ground surface, shown as ground surface 170. In one embodiment, the first cylinder 114 is a hydraulic cylinder. In other embodiments, the first cylinder 114 is another type of actuator (e.g., a linear actuator, a rotary actuator, or still another type of device, etc.) that may be powered hydraulically, electrically, or still otherwise powered.

As shown in FIGS. 14-15, the second outrigger 120 includes a second frame member, shown as second lateral member 122, a second actuator, shown as second cylinder 124, and a second contact pad, shown as second contact pad 128. The second cylinder 124 includes a second cylinder barrel, shown as second cylinder barrel 125, and a second rod, shown as second rod 126. The second rod 126 is coupled to the second contact pad 128. The second cylinder 124 is positioned to extend the second contact pad 128 downward by extending the second rod 126 from the second cylinder barrel 125. The second cylinder 124 extends the second contact pad 128 into contact with the ground surface 170. In one embodiment, the second cylinder 124 is a hydraulic cylinder. In other embodiments, the second cylinder 124 is another type of actuator (e.g., a linear actuator, a rotary actuator, or still another type of device, etc.) that may be powered hydraulically, electrically, or still otherwise powered.

According to the exemplary embodiment shown in FIGS. 6 and 13-14, a housing, shown as outrigger housing 106, slidably couples the first outrigger 110 and the second outrigger 120 to the frame 12. As shown in FIGS. 13-14, the first lateral member 112 and the second lateral member 122 are disposed in the fully extended position and spaced a distance 160. In one embodiment, an actuator (e.g., a linear actuator, a rotary actuator, etc.) or a pair of actuators is positioned within the outrigger housing 106 to extend the first lateral member 112 and the second lateral member 122 laterally outward from opposing lateral sides of the frame 12. The distance 160 may be the distance between the center of the first contact pad 118 and the center of the second contact pad 128 when the pair of outriggers 100 is fully extended. In one embodiment, the distance 160 is no more than eighteen feet. In other embodiments, the distance 160 is greater than eighteen feet.

As shown in FIG. 14, the stability foot 130 includes a third actuator, shown as third cylinder 134, and a third contact pad, shown as third contact pad 138. The third cylinder 134 includes a third cylinder barrel, shown as third cylinder barrel 135, and a third rod, shown as third rod 136. The third rod 136 is coupled to the third contact pad 138. The third cylinder 134 is positioned to extend the third contact pad 138 downward by extending the third rod 136 from the third cylinder barrel 135. The third cylinder 134 extends the third contact pad 138 into contact with the ground surface 170. In one embodiment, the third cylinder 134 is a hydraulic cylinder. In other embodiments, the third cylinder 134 is another type of actuator (e.g., a linear actuator, a rotary actuator, or still another type of device, etc.) that may be powered hydraulically, electrically, or still otherwise powered.

Referring to FIGS. 13-14, the fire apparatus 10 includes a pair of front tires, shown as front tires 17, and a set of rear tires, shown as rear tires 19. When actuated, the first outrigger 110, the second outrigger 120, and the stability foot 130 elevate the rear section 16 of the fire apparatus 10 from the ground surface 170. The front tires 17 may remain in contact with the ground surface 170, while the rear tires 19 may be lifted a height, shown as height 150, above the ground surface 170. In one embodiment, the height 150 is less than twelve inches. In other embodiments, the height 150 is at least twelve inches.

Figure 16:
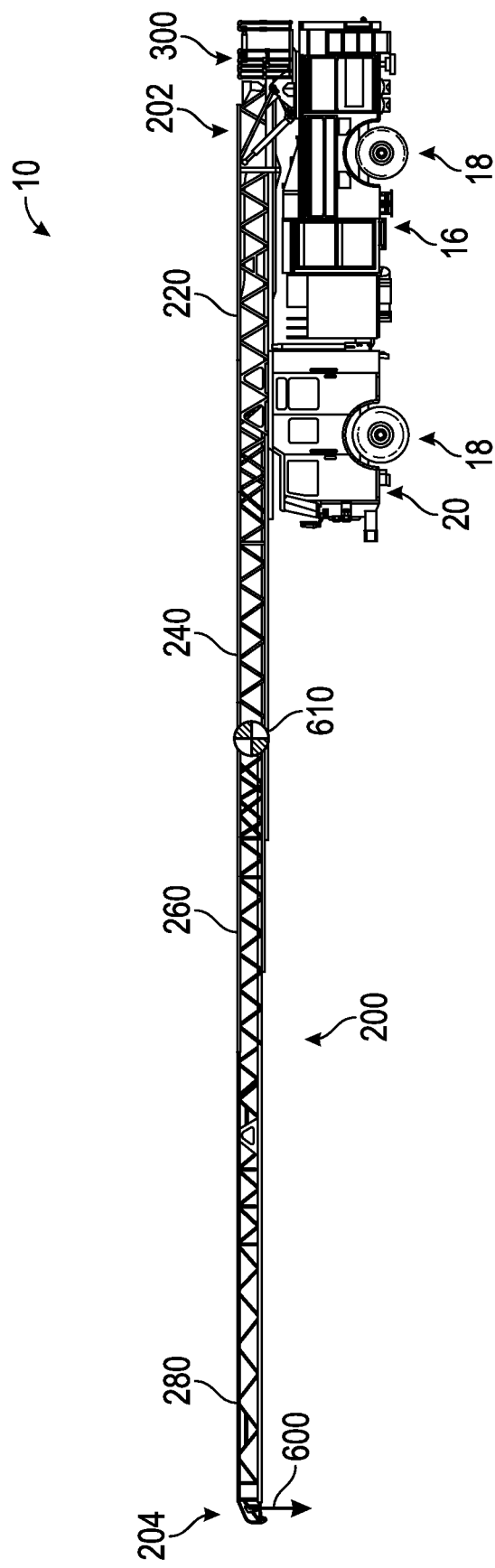
FIG. 16 is a left side view of the fire apparatus of FIG. 1 with an aerial ladder assembly extended, according to an exemplary embodiment.
Figure 17:
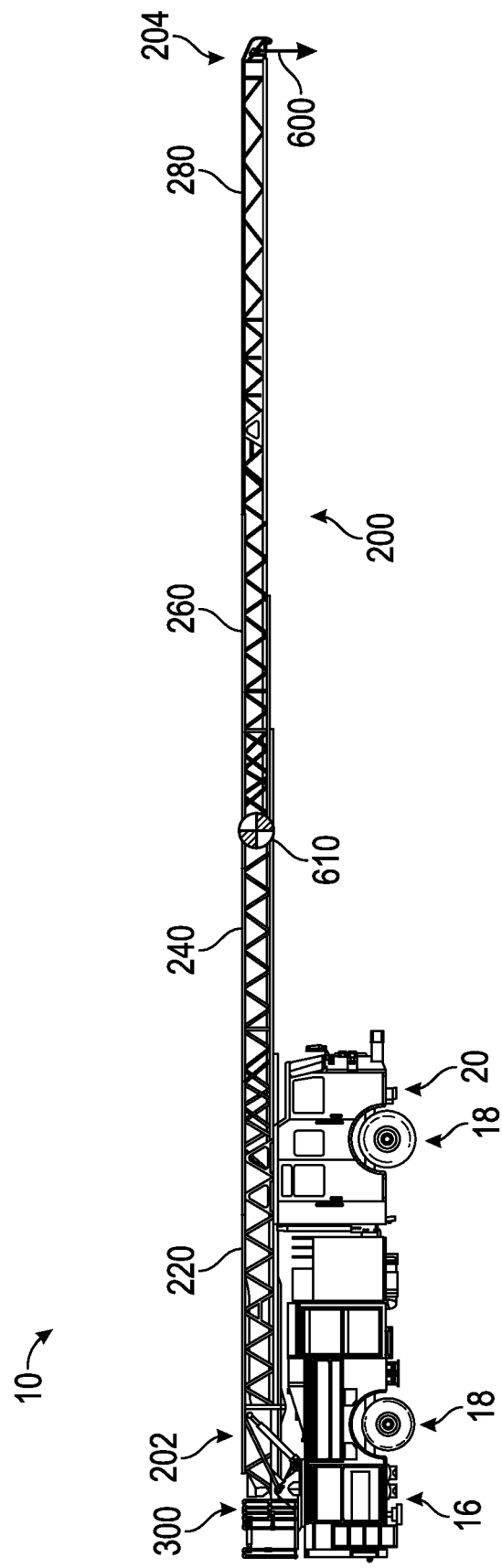
FIG. 17 is a right side view of the fire apparatus of FIG. 1 with an aerial ladder assembly extended, according to an exemplary embodiment.

Referring now to FIGS. 16-17, the aerial ladder assembly 200 of the fire apparatus 10 includes a plurality of extensible ladder sections. As shown in FIGS. 16-17, the plurality of extensible ladder sections includes a first ladder section, shown as base section 220, a second ladder section, shown as lower middle section 240, a third ladder section, shown as upper middle section 260, and a fourth ladder section, shown as fly section 280. The first end 202 of the aerial ladder assembly 200 may be the proximal end (e.g., base end, pivot end, etc.) of the base section 220. The second end 204 of the aerial ladder assembly 200 may be the distal end (e.g., free end, platform end, implement end, etc.) of the fly section 280. According to an exemplary embodiment, the second end 204 of the aerial ladder assembly 200 (i.e., the distal end of the fly section 280, etc.) is extensible to the horizontal reach of at least 90 feet (e.g., at least 100 feet, etc.) when the aerial ladder assembly 200 is selectively repositioned into a plurality of operating orientations.

As shown in FIGS. 16-21, a load, shown as load 600 (e.g., tip load, tip capacity, etc.), may be applied to the aerial ladder assembly 200 (e.g., at the furthest-most rung of fly section 280, etc.), and various components of the fire apparatus 10 each have a center of gravity ("CG"). Such components may have a first CG, shown as ladder assembly CG 610, a second CG, shown as front cabin CG 620, a third CG, shown as pump CG 630, a fourth CG, shown as water tank CG 640, a fifth CG, shown as rear section CG 650, and a sixth CG, shown as turntable CG 660. The ladder assembly CG 610 may be representative of the CG of the four ladder sections of the aerial ladder assembly 200 (e.g., the base section 220, the lower middle section 240, the upper middle section 260, the fly section 280, etc.). The front cabin CG 620 may be representative of the CG of the various components in and around the front cabin 20 (e.g., the front axle 18, front tires 17, front suspension 54, front body assembly, front portion of the chassis, etc.). The pump CG 630 may be representative of the CG of the pump 22 and the components of the pump house 50. The water tank CG 640 may be representative of the CG of the water tank 58. The rear section CG 650 may be representative of the CG of the various component of the rear section 16 (e.g., the rear axle 18, rear tires 19, outriggers 100, stability foot 130, torque box 400, pedestal 402, ground ladders 46, rear body assembly, rear portion of the chassis, etc.). The turntable CG 660 may be representative of the CG of the turntable 300.

As shown in FIGS. 18-21, the aerial ladder assembly 200 is disposed in a retracted configuration. During operation, the aerial ladder assembly 200 may be extended as shown in FIGS. 16-17. While shown in FIGS. 18-21 as disposed in the retracted configuration, it should be understood that the aerial ladder assembly 200 may be extended during use in various operating orientations. A variety of stability lines are generated for the fire apparatus 10 while in the various operating orientations. The stability lines may be disposed along the single front axle 18, through the center of the single front axle 18 and one of the first outrigger 110 and the second outrigger 120, through the stability foot 130 and one of the first outrigger 110 and the second outrigger 120, or laterally across the stability foot 130, among other alternatives.

The various components of the fire apparatus 10 produce a positive moment or a negative moment that varies based on the location of their respective CGs. Positive moments (e.g., torques, etc.) may be generated by load 600 and the weights of components having CGs located on a first side of the stability line (e.g., a side of the stability line where the load 600 is located, etc.). Negative moments may be generated by the weights of components having CGs located on an opposing second side of the stability line (e.g., a side of the stability line where the load 600 is not located, etc.). According to an exemplary embodiment, various components of the fire apparatus 10 (e.g., frame 12, turntable 300, rear section 16, pump 22, water tank 58, etc.) are positioned such that their weights counterbalance a total positive moment (e.g., generated by load 600 and the weights of components having CGs located on the first side of the stability line, etc.) when the aerial ladder assembly 200 is extended to the horizontal reach of at least 90 feet (e.g., at least 100 feet, etc.). The magnitude of the positive and negative moments are proportional to the distances (e.g., perpendicular distances, etc.) between the component's CG and the stability line (e.g., a greater distance from the stability line increases the moment, a shorter distance from the stability line decreases the moment, a CG disposed on the stability line results in a negligible moment or zero moment, etc.).

Figure 18:
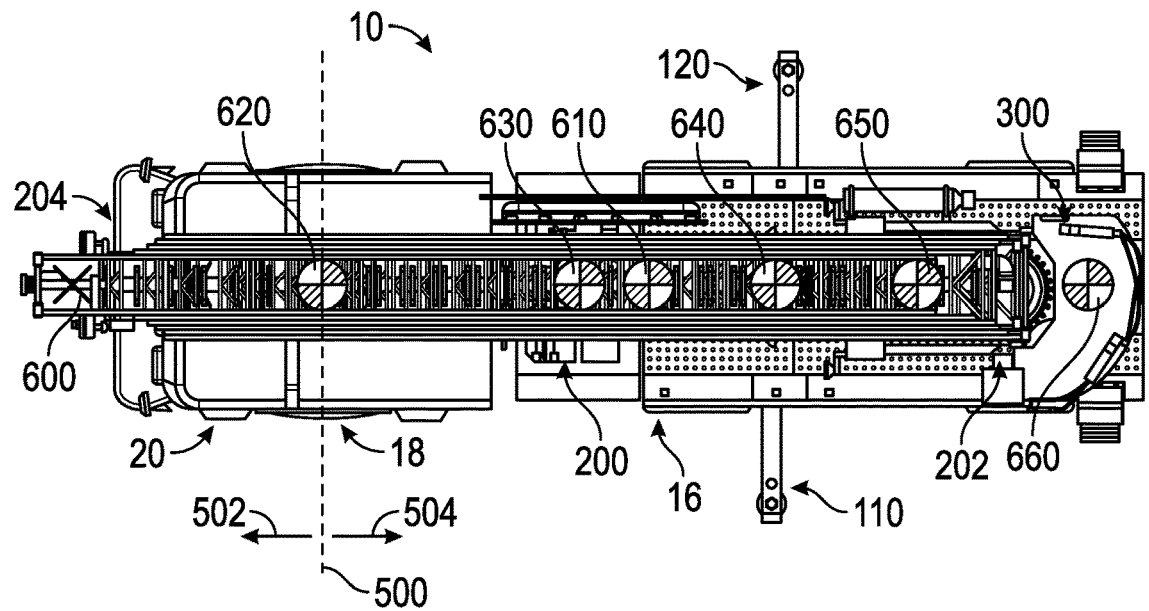
FIG. 18 is a top view of the fire apparatus of FIG. 1 with the single set of outriggers extended and an aerial ladder assembly positioned forward, according to an exemplary embodiment.

As shown in FIGS. 16-18, the aerial ladder assembly 200 is configured in a first operating orientation. In the first operating orientation, the aerial ladder assembly 200 is disposed in a forward position in which the aerial ladder assembly 200 extends over the front cabin 20 (e.g., parallel to the longitudinal axis 14, etc.). When aerial ladder assembly 200 is extended, the ladder assembly CG 610 may be positioned forward of the front cabin 20 (e.g., within the lower middle section 240, near the connection between the lower middle section 240 and the upper middle section 260 of the aerial ladder assembly 200, etc.). As shown in FIG. 18, the fire apparatus 10 includes a stability line 500 when the aerial ladder assembly 200 is selectively positioned in the first operating orientation (e.g., a forward position, etc.). The stability line 500 is disposed along the single front axle 18. As shown in FIG. 18, when the load 600 is applied to the second end 204 of the aerial ladder assembly 200 while in the first operating orientation, the load 600 generates a first positive moment 502 about the stability line 500. The ladder assembly CG 610 generates a second positive moment 502 about the stability line 500. The front cabin CG 620 may generate a negligible moment about the stability line 500 as the front cabin CG 620 may be substantially disposed along the stability line 500. The pump CG 630, the water tank CG 640, the rear section CG 650, and the turntable CG 660, among other components, generate negative moments 504 about the stability line 500. In the first operating orientation, the negative moments 504 at least balance the positive moments 502 while the aerial ladder assembly 200 is extended to the horizontal reach of at least 90 feet (e.g., at least 100 feet, etc.) and a load 600 of at least 750 pounds is applied.

Figure 19:
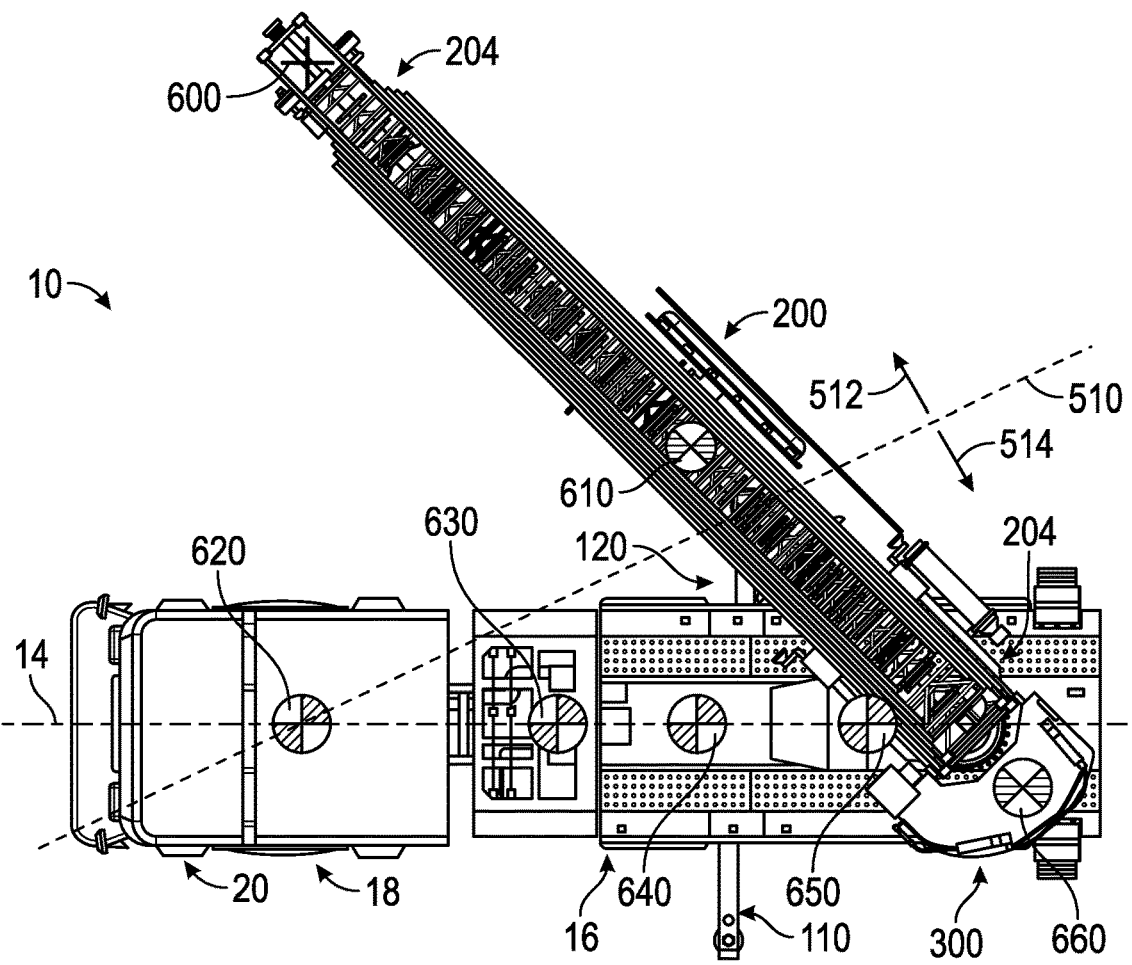
FIG. 19 is a top view of the fire apparatus of FIG. 1 with the single set of outriggers extended and an aerial ladder assembly positioned at a forward angle, according to an exemplary embodiment.

As shown in FIG. 19, the aerial ladder assembly 200 is configured in a second operating orientation. In the second operating orientation, the aerial ladder assembly 200 is disposed in a forward angled position in which the aerial ladder assembly 200 extends off to a side of the fire apparatus 10, biased towards the front cabin 20. As shown in FIG. 19, the fire apparatus 10 includes a stability line 510 when the aerial ladder assembly 200 is selectively positioned in the forward angled position (e.g., a forward angled position to the right side, a forward angled position to the left side, etc.). As shown in FIG. 19, the aerial ladder assembly 200 is selectively positioned to extend off to the right side of the fire apparatus 10 at a forward angle. The stability line 510 may extend through the center of the single front axle 18 and the second outrigger 120. In other embodiments, the aerial ladder assembly 200 is selectively positioned to extend off to the left side of the fire apparatus 10 at a forward angle, and the stability line 510 may extend through the center of the single front axle 18 and the first outrigger 110. As shown in FIG. 19, when the load 600 is applied to the second end 204 of the aerial ladder assembly 200 while in the second operating orientation, the load 600 generates a first positive moment 512 about the stability line 510. The ladder assembly CG 610 generates a second positive moment 512 about the stability line 510. The front cabin CG 620 may generate a negligible moment about the stability line 510 as the front cabin CG 620 may be substantially disposed along the stability line 510. The pump CG 630, the water tank CG 640, the rear section CG 650, and the turntable CG 660, among other components, generate negative moments 514 about the stability line 510. In the second operating orientation, the negative moments 514 at least balance the positive moments 512 while the aerial ladder assembly 200 is extended to the horizontal reach of at least feet (e.g., at least 100 feet, etc.) and a load 600 of at least 750 pounds is applied.

Figure 20:
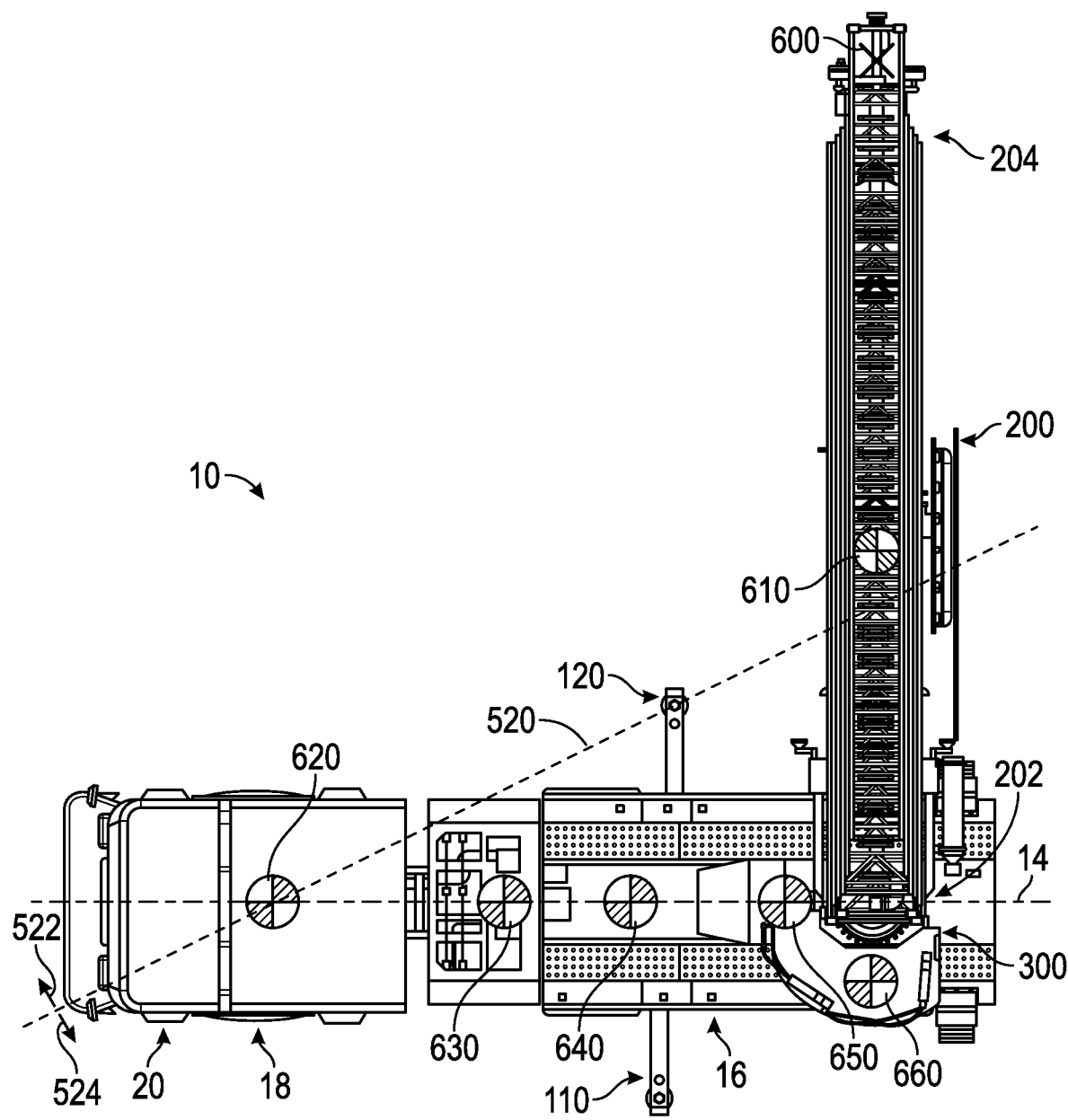
FIG. 20 is a top view of the fire apparatus of FIG. 1 with the single set of outriggers extended and an aerial ladder assembly positioned to one side, according to an exemplary embodiment.

As shown in FIG. 20, the aerial ladder assembly 200 is configured in a third operating orientation. In the third operating orientation, the aerial ladder assembly 200 is disposed in a sideward position in which the aerial ladder assembly 200 extends from a lateral side of the chassis (e.g., perpendicular to the longitudinal axis 14, etc.). As shown in FIG. 19, the fire apparatus 10 includes a stability line 520 when the aerial ladder assembly 200 is selectively positioned in the third operating orientation (e.g., laterally to the right side, laterally to the left side, etc.). As shown in FIG. 19, the aerial ladder assembly 200 is selectively positioned to extend laterally off to the right side of the fire apparatus 10. The stability line 520 may extend through the center of the single front axle 18 and the second outrigger 120. In other embodiments, the aerial ladder assembly is selectively positioned to extend laterally off to the left side of the fire apparatus 10, and the stability line 520 may extend through the center of the single front axle 18 and the first outrigger 110. As shown in FIG. 20, when the load 600 is applied to the second end 204 of the aerial ladder assembly 200 while in the third operating orientation, the load 600 generates a first positive moment 522 about the stability line 520. The ladder assembly CG 610 generates a second positive moment 522 about the stability line 520. The front cabin CG 620 may generate a negligible moment about the stability line 520 as the front cabin CG 620 may be substantially disposed along the stability line 520. The pump CG 630, the water tank CG 640, the rear section CG 650, and the turntable CG 660, among other components, generate negative moments 524 about the stability line 520. In the third operating orientation, the negative moments 524 at least balance the positive moments 522 while the aerial ladder assembly 200 is extended to the horizontal reach of at least 90 feet (e.g., at least 100 feet, etc.) and a load 600 of at least 750 pounds is applied.

Figure 21:
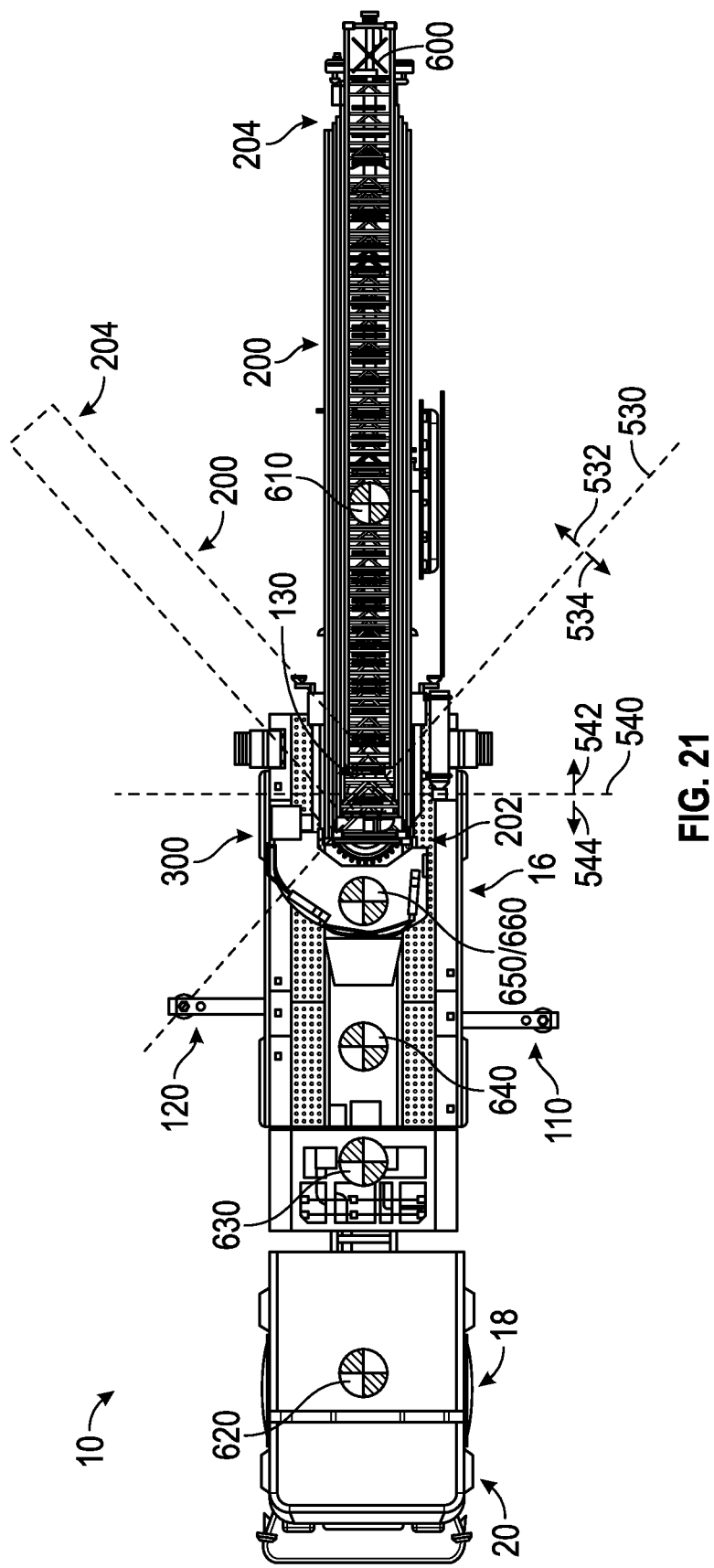
FIG. 21 is a top view of the fire apparatus of FIG. 1 with the single set of outriggers extended and an aerial ladder assembly positioned both at a rearward angle and backward, according to an exemplary embodiment.

As shown in FIG. 21, the aerial ladder assembly 200 is configured in a fourth operating orientation and a fifth operating orientation. In the fourth operating orientation, the aerial ladder assembly 200 is disposed in a rearward angled position in which the aerial ladder assembly 200 is extended off to a side of the fire apparatus 10, biased towards the rear section 16. As shown in FIG. 21, the fire apparatus 10 includes a stability line 530 when the aerial ladder assembly 200 is selectively positioned in the fourth operating orientation (e.g., a rearward angled position to the right side, a rearward angled position to the left side, etc.). As shown in FIG. 21, the aerial ladder assembly 200 is selectively positioned to extend off to the right side of the fire apparatus at a rearward angle. The stability line 530 extends through the second outrigger 120 and the stability foot 130. In other embodiments, the aerial ladder assembly 200 is selectively positioned to extend off to the left side of the fire apparatus 10 at a rearward angle, and the stability line 530 extends through the first outrigger 110 and the stability foot 130. As shown in FIG. 21, the load 600 is applied to the second end 204 of the aerial ladder assembly 200 while in the fourth operating orientation, and the load 600 generates a first positive moment 532 about the stability line 530. The ladder assembly CG 610 generates a second positive moment 532 about the stability line 530. The front cabin CG 620, the pump CG 630, the water tank CG 640, the rear section CG 650, and the turntable CG 660, among other components, generate negative moments 534 about the stability line 530. In the fourth operating orientation, the negative moments 534 at least balance the positive moments 532 while the aerial ladder assembly 200 is extended to the horizontal reach of at least 90 feet (e.g., at least 100 feet, etc.) and a load 600 of at least 750 pounds is applied.

FIG. 21 also shows the aerial ladder assembly 200 configured in a fifth operating orientation. In the fifth operating orientation, the aerial ladder assembly 200 is disposed in a rearward position in which the aerial ladder assembly 200 extends away from the front cabin 20 (e.g., parallel to the longitudinal axis 14, opposite of the first operating orientation, etc.). As shown in FIG. 21, the fire apparatus 10 includes a stability line 540 when the aerial ladder assembly 200 is selectively positioned in the fifth operating orientation (e.g., an opposing rearward position, etc.). The stability line 540 is a line disposed laterally across the stability foot 130 (e.g., perpendicular to the aerial ladder assembly 200, perpendicular to the longitudinal axis 14, etc.). As shown in FIG. 21, when the load 600 is applied to the second end 204 of the aerial ladder assembly 200 while in the fifth operating orientation, the load 600 generates a first positive moment 542 about the stability line 540. The ladder assembly CG 610 generates a second positive moment 542 about the stability line 500. The front cabin CG 620, the pump CG 630, the water tank CG 640, the rear section CG 650, and the turntable CG 660, among other components, generate negative moments 544 about the stability line 540. In the fifth operating orientation, the negative moments 544 at least balance the positive moments 542 while the aerial ladder assembly 200 is extended to the horizontal reach of at least 90 feet (e.g., at least 100 feet, etc.) and a load 600 of at least 750 pounds is applied.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

The invention claimed is:

1. A quint configuration fire apparatus comprising:
   a chassis defining a longitudinal axis;
   a single front axle coupled to the chassis;
   a single rear axle coupled to the chassis, wherein the single rear axle has a gross axle weight rating of less than or equal to 33,500 pounds;
   a body coupled to the chassis, the body having storage configured to receive a ground ladder and a fire hose;
   a pump supported by the chassis;
   a water tank supported by the chassis;
   a ladder assembly having a proximal end supported by the chassis, wherein the ladder assembly is extendable to a horizontal reach of at least 90 feet and a vertical height of at least 95 feet, and wherein the ladder assembly is configured to support a tip load of at least 750 pounds; and
   a stability system including (a) exactly two stabilizers positioned between the single front axle and the single rear axle and (b) at least a third stabilizer positioned rearward of the single rear axle, wherein the exactly two stabilizers are offset relative to one another along the longitudinal axis, and wherein the exactly two stabilizers are configured to protrude from opposing lateral sides in a direction perpendicular to the longitudinal axis;
   wherein the combination of (a) a center of gravity of at least one of the chassis, the body, the pump, or the water tank with (b) the stability system including the exactly two stabilizers positioned between the single front axle and the single rear axle is configured to counterbalance the tip load of at least 750 pounds applied to a distal end of the ladder assembly while the ladder assembly is (a) extended to the horizontal reach of at least 90 feet and (b) rotated between a plurality of operating orientations.

2. The quint configuration fire apparatus of claim 1, wherein the plurality of operating orientations include a side orientation where the distal end of the ladder assembly extends to a side of the body.

3. The quint configuration fire apparatus of claim 2, wherein the side orientation includes a lateral orientation where the ladder assembly is oriented perpendicular to the longitudinal axis of the chassis.

4. The quint configuration fire apparatus of claim 1, wherein the plurality of operating orientations include a forward orientation where the distal end of the ladder assembly extends forward of the body.

5. The quint configuration fire apparatus of claim 1, wherein the plurality of operating orientations include a rearward orientation where the distal end of the ladder assembly extends rearward of the body.

6. The quint configuration fire apparatus of claim 1, wherein the plurality of operating orientations include at least (a) a forward orientation where the distal end of the ladder assembly extends forward of the body, (b) a rearward orientation where the distal end of the ladder assembly extends rearward of the body, and (c) a side orientation where the distal end of the ladder assembly extends to a side of the body.

7. The quint configuration fire apparatus of claim 1, wherein the exactly two stabilizers engage a ground surface at a total of two contact points between the single front axle and the single rear axle.

8. A quint configuration fire apparatus comprising:
a chassis defining a longitudinal axis;
a single front axle;
a single rear axle;
a body having storage configured to receive a ground ladder and a fire hose;
a pump;
a water tank;
a ladder assembly extendable to a vertical height of at least 95 feet; and
a stability system including exactly two stabilizers positioned between the single front axle and the single rear axle, wherein the exactly two stabilizers are offset relative to one another along the longitudinal axis, and wherein the exactly two stabilizers are configured to protrude from opposing lateral sides in a direction perpendicular to the longitudinal axis;
wherein the combination of (a) a center of gravity of at least one of the chassis, the body, the pump, or the water tank with (b) the stability system including the exactly two stabilizers positioned between the single front axle and the single rear axle counterbalances a tip load of at least 750 pounds applied to a distal end of the ladder assembly while the ladder assembly is (a) extended to a maximum permitted horizontal reach thereof and (b) rotated between each of a plurality of operating orientations.

9. The quint configuration fire apparatus of claim 8, wherein the plurality of operating orientations include at least (a) a forward orientation where the distal end of the ladder assembly extends forward of the body, (b) a rearward orientation where the distal end of the ladder assembly extends rearward of the body, and (c) a side orientation where the distal end of the ladder assembly extends to a side of the body.

10. The quint configuration fire apparatus of claim 9, wherein the side orientation includes a lateral orientation where the ladder assembly is oriented perpendicular to the longitudinal axis of the chassis.

11. The quint configuration fire apparatus of claim 10, wherein the stability system includes at least a third stabilizer positioned rearward of the single rear axle.

12. The quint configuration fire apparatus of claim 11, wherein the exactly two stabilizers engage a ground surface at a total of two contact points between the single front axle and the single rear axle.

13. The quint configuration fire apparatus of claim 12, wherein the single rear axle has a gross axle weight rating of less than or equal to 33,500 pounds.

14. The quint configuration fire apparatus of claim 13, wherein the ladder assembly is sized such that the ladder assembly is physically capable of extending to a horizontal reach of at least 90 feet.

15. The quint configuration fire apparatus of claim 14, wherein the maximum permitted horizontal reach is greater than 72 feet.

16. The quint configuration fire apparatus of claim 15, wherein the maximum permitted horizontal reach is at least 90 feet.

17. A quint configuration fire apparatus comprising:
a chassis;
a single front axle;
a single rear axle;
a body;
a pump;
a water tank;
a ladder assembly sized such that the ladder assembly is physically capable of extending to a vertical height of at least 95 feet; and
a stability system positioned between the single front axle and the single rear axle, the stability system consisting of exactly two stabilizers, wherein the exactly two stabilizers engage a ground surface at a total of two contact points between the single front axle and the single rear axle;
wherein the combination of (a) a center of gravity of at least one of the chassis, the body, the pump, or the water tank with (b) the stability system consisting of the exactly two stabilizers positioned between the single front axle and the single rear axle is configured to counterbalance a tip load of at least 750 pounds applied to a distal end of the ladder assembly while the ladder assembly is (a) extended to a maximum permitted horizontal reach thereof and (b) rotated between a plurality of operating orientations including at least (i) a forward orientation where the distal end of the ladder assembly extends forward of the body, (ii) a rearward orientation where the distal end of the ladder assembly extends rearward of the body, and (iii) a side orientation where the distal end of the ladder assembly extends to a side of the body.

18. The quint configuration fire apparatus of claim 17, wherein the side orientation includes a lateral orientation where the ladder assembly is oriented perpendicular to a longitudinal axis of the chassis.

19. The quint configuration fire apparatus of claim 18, wherein the single rear axle has a gross axle weight rating of less than or equal to 33,500 pounds.

20. The quint configuration fire apparatus of claim 19, wherein the ladder assembly is sized such that the ladder assembly is physically capable of extending to a horizontal reach of at least 90 feet.

21. The quint configuration fire apparatus of claim 17, further comprising at least a third stabilizer positioned rearward of the single rear axle, wherein the combination of (a) the center of gravity of the at least one of the chassis, the body, the pump, or the water tank with (b) the third stabilizer positioned rearward of the single rear axle and the stability system consisting of the exactly two stabilizers positioned between the single front axle and the single rear axle is configured to counterbalance the tip load of at least 750 pounds applied to the distal end of the ladder assembly while the ladder assembly is (a) extended to the maximum permitted horizontal reach thereof and (b) rotated between the plurality of operating orientations.

\* \* \* \* \*